US012593763B2

(12) United States Patent
Sakaguchi et al.

(10) Patent No.: US 12,593,763 B2
(45) Date of Patent: Apr. 7, 2026

(54) CULTIVATION DEVICE

(71) Applicant: PLANTX Corp., Chiba (JP)

(72) Inventors: Shunsuke Sakaguchi, Chiba (JP); Takuji Akiyama, Chiba (JP); Kazutaka Ohshima, Chiba (JP); Kosuke Yamada, Chiba (JP); Shinjiro Yamada, Chiba (JP)

(73) Assignee: PLANTX Corp., Chiba (JP)

( * ) Notice: Subject to any disclaimer, the term of this patent is extended or adjusted under 35 U.S.C. 154(b) by 0 days.

(21) Appl. No.: 17/049,499

(22) PCT Filed: Apr. 12, 2019

(86) PCT No.: PCT/JP2019/016040
§ 371 (c)(1),
(2) Date: Oct. 21, 2020

(87) PCT Pub. No.: WO2019/208279
PCT Pub. Date: Oct. 31, 2019

(65) Prior Publication Data
US 2021/0185955 A1    Jun. 24, 2021

(30) Foreign Application Priority Data
Apr. 23, 2018    (JP) ................................. 2018-082389

(51) Int. Cl.
*A01G 31/06*        (2006.01)
*A01G 31/04*        (2006.01)
(52) U.S. Cl.
CPC ............. *A01G 31/06* (2013.01); *A01G 31/04* (2013.01)
(58) Field of Classification Search
CPC ........ A01G 31/06; A01G 31/04; A01G 9/246; A01G 9/247
See application file for complete search history.

(56) References Cited

U.S. PATENT DOCUMENTS 2,917,867 A * 12/1959 Bailey .................... A01G 31/06
99/425
4,163,342 A * 8/1979 Fogg ...................... A01G 9/249
47/DIG. 6
(Continued)

FOREIGN PATENT DOCUMENTS

AU          2017274915 A1    12/2018
AU          2017274915 A8    1/2019
(Continued)

OTHER PUBLICATIONS

Machine translation of JP-2013034402-A (Year: 2021).*
(Continued)

*Primary Examiner* — Timothy D Collins
*Assistant Examiner* — Brittany A Lowery
(74) *Attorney, Agent, or Firm* — HoustonHogle LLP

(57) ABSTRACT

A cultivation device is disclosed for using in an artificial light plant factory. The device includes a cultivation room having a closable inside and a plurality of cultivation chambers including a plurality of stages in the cultivation room in the vertical direction. The device further includes an air circulation device that supplies air adjusted to a predetermined condition to each of the plurality of cultivation chambers at a predetermined flow velocity and collects and circulates the supplied air from the plurality of cultivation chambers. A nutrient solution circulation device is included to supply nutrient solution adjusted to a predetermined condition to each of the plurality of cultivation chambers at a predetermined flow velocity, and collects and circulates the supplied nutrient solution from the plurality of cultivation chambers.

20 Claims, 17 Drawing Sheets

(56)           References Cited

U.S. PATENT DOCUMENTS

| | | | | | |
|---|---|---|---|---|---|
| 4,513,531 | A | * | 4/1985 | Lestraden | A01G 31/06 47/17 |
| 5,493,808 | A | * | 2/1996 | Munday | A01G 9/246 47/60 |
| 10,624,275 | B1 | * | 4/2020 | Lewis | A01G 9/247 |
| 2006/0162246 | A1 | * | 7/2006 | Okabe | A01G 9/16 47/1.01 R |
| 2011/0192082 | A1 | | 8/2011 | Uchiyama | |
| 2012/0144740 | A1 | * | 6/2012 | Igarashi | A01G 31/06 47/62 R |
| 2016/0014977 | A1 | * | 1/2016 | Esaki | A01G 31/06 47/66.6 |
| 2016/0128886 | A1 | * | 5/2016 | Merino | E04H 1/1277 600/21 |
| 2016/0212947 | A1 | * | 7/2016 | Uchiyama | A01G 9/20 |
| 2016/0345518 | A1 | * | 12/2016 | Collier | A01G 9/249 |
| 2016/0360712 | A1 | * | 12/2016 | Yorio | A01G 31/06 |
| 2017/0094920 | A1 | * | 4/2017 | Ellins | A01G 31/06 99/425 |
| 2018/0035624 | A1 | * | 2/2018 | Itoh | A01G 31/06 |
| 2018/0092337 | A1 | * | 4/2018 | Hori | A01K 63/04 |
| 2018/0103599 | A1 | * | 4/2018 | Zhan | A01G 31/02 |
| 2018/0168111 | A1 | * | 6/2018 | Yasukuri | A01G 31/06 |
| 2018/0359946 | A1 | * | 12/2018 | Rossi | A01G 9/20 |
| 2019/0110407 | A1 | * | 4/2019 | Su | A01G 27/00 |
| 2019/0261589 | A1 | * | 8/2019 | Pham | A01G 9/027 |
| 2019/0289794 | A1 | * | 9/2019 | Matsumura | A01G 9/00 |
| 2020/0236883 | A1 | * | 7/2020 | Ambrosi | A01G 9/143 |

FOREIGN PATENT DOCUMENTS

| | | | | |
|---|---|---|---|---|
| IT | 201700092004 | A1 | * | 8/2017 |
| JP | 2002-291349 | A | | 10/2002 |
| JP | 2005-021065 | A | | 1/2005 |
| JP | 2013034402 | A | * | 2/2013 |
| JP | 2016000002 | A | | 1/2016 |
| JP | 2018023336 | A | * | 2/2018 |
| JP | 2019-010077 | A | | 1/2019 |
| KR | 10-2016-0127865 | A | | 11/2016 |
| WO | WO 2009119778 | A1 | | 10/2009 |
| WO | WO 2016181699 | A1 | | 11/2016 |
| WO | WO 2017208906 | A1 | | 5/2019 |

OTHER PUBLICATIONS

Machine translation of IT-201700092004-A1 (Year: 2021).*
Translation of FR_2648011_A1 (Year: 1990).*
International Search Report of the International Searching Authority, mailed on May 21, 2019, from International Application No. PCT/JP2019/016040, filed on Apr. 12, 2019. 5 pages.
International Preliminary Report on Patentability, issued on Oct. 27, 2020, from International Application No. PCT/JP2019/016040, filed on Apr. 12, 2019. 16 pages.
Notification of Reasons for in the JP Patent 2020-516235, mailed on Jul. 18, 2023. 46 pages.

* cited by examiner (WR)

CULTIVATION DEVICE

RELATED APPLICATIONS

This application is a § 371 National Phase Application of International Application No. PCT/JP2019/016040, filed on Apr. 12, 2019, now International Publication No. WO2019/208279 A1, published on Oct. 31, 2019, which International Application claims priority to Japanese Application 2018-082389, filed on Apr. 23, 2018, both of which are incorporated herein by reference in their entirety.

TECHNICAL FIELD

The present invention relates to a cultivation device used in an artificial light plant factory.

BACKGROUND ART

Plant factories are attracting attention as a solution to problems such as food shortages due to global population growth and a decrease in agricultural production due to a decrease in rural population with aging in developed countries such as Japan.

Plant factories are roughly divided into two types: fully artificial light type and sunlight utilization type. In the fully artificial light type, the plants are cultivated using only an artificial light source without using sunlight in an isolated environment. In the sunlight utilization type, which is based on utilization of sunlight in an environment isolated to a greenhouse, the plants are cultivated using light supplement with artificial light or high temperature control technology in summer.

In a general fully artificial light type plant factory, a plurality of multi-stage cultivation shelves including artificial light sources in each stage are arranged in a cultivation room in an isolated environment, and air conditioners and the like are installed on the ceiling or the upper side of the cultivation room. Since the temperature of each cultivation shelf rises due to waste heat when the artificial light source is turned on, the air in the cultivation room is circulated by an air conditioner, and the temperature and humidity are controlled to be uniform among the cultivation shelves (see Patent Document 1).

Further, in order to control the amount of nutrient solution supplied to the plant, a circulation type nutrient solution supply device is used (see Patent Document 2).

Patent Document 1: Japanese Unexamined Patent Application, Publication No. 2002-291349

Patent Document 2: Japanese Unexamined Patent Application, Publication No. 2005-21065

DISCLOSURE OF THE INVENTION

Problems to be Solved by the Invention

Although attempts are made to uniformly control the cultivation environment in the cultivation room by using the air conditioner as described above, difference in the temperature and humidity between the cultivation shelf installed near the air conditioner and the cultivation shelf installed far away from the air conditioner is actually generated. In addition, difference in the temperature and humidity is also generated in the vertical direction of the cultivation shelves.

In addition, even if a certain amount of nutrient solution is constantly supplied to the plant by the circulation type nutrient solution supply device, the water temperature of the nutrient solution rises due to the waste heat during the period when the artificial light sources are turned on, and gradually drops during the period when the artificial light sources are turned off, thereby not becoming constant.

Thus, in the cultivation room of a conventional plant factory, there is generated unevenness in air temperature and humidity depending on the location, and change in temperature of the nutrient solution with time. Since the growth rate of plants is affected by changes in air temperature, humidity, or nutrient solution temperature, such local changes or changes over time in the cultivation environment lead to a decrease in the productivity of the plant factory.

Therefore, an object of the present invention is to maintain a substantially constant cultivation environment depending on the location or time in a plant factory.

Means for Solving the Problems

The present invention relates to a cultivation device used in an artificial light plant factory, the device including: a cultivation room having a closable inside; a plurality of cultivation chambers defined by dividing the cultivation room in the vertical direction at predetermined intervals; an air circulation device that supplies air adjusted to a predetermined condition to each of the plurality of cultivation chambers at a predetermined flow velocity, and collects and circulates the supplied air from the plurality of cultivation chambers; and a nutrient solution circulation device that supplies nutrient solution adjusted to a predetermined condition to each of the plurality of cultivation chambers at a predetermined flow velocity, and collects and circulates the supplied nutrient solution from the plurality of cultivation chambers.

Further, it is preferable to supply the air adjusted to the predetermined condition to each of the plurality of cultivation chambers at a flow velocity of a set value that is changeable.

Further, it is preferable to supply the nutrient solution adjusted to the predetermined condition to each of the plurality of cultivation chambers at a flow velocity of a set value that is changeable.

Further, it is preferable that a flow direction of the nutrient solution supplied to the cultivation chamber by the air circulation device and the nutrient solution circulation device is along a transverse direction of the cultivation chamber.

Further, it is preferable that a flow direction of the air supplied to the cultivation chamber by the air circulation device and the nutrient solution circulation device is along a transverse direction of the cultivation chamber.

Further, it is preferable that a flow direction of the air supplied to the cultivation chamber by the air circulation device and the nutrient solution circulation device is along from an upper side to a lower side of the cultivation chamber.

Further, it is preferable that the cultivation device includes a plurality of rectangular cultivation plates, wherein the plurality of cultivation plates are arranged in the cultivation chamber so that the transverse direction of the cultivation plates is along a longitudinal direction of the cultivation chamber.

Further it is preferable that the cultivation device includes a nutrient solution tray arranged in the cultivation chamber, and used for causing nutrient solution to flow therein, wherein the nutrient solution tray is configured with a rectangular tray that is substantially the same size as the cultivation plate and on which the cultivation plate can be arranged, and the plurality of rectangular trays are arranged in the cultivation chamber so that the transverse direction of the rectangular trays is along the longitudinal direction of the cultivation chamber.

Further, it is preferable that the nutrient solution tray includes an inclined surface inclining at a predetermined angle in the transverse direction of the cultivation chamber so that a downstream side of the nutrient solution flow is lower.

Further, it is preferable that the cultivation chamber is configured with a box-shaped member, has a chamber opening for inserting and removing the cultivation plate and a chamber lid that can open and close the chamber opening, on one end side in the longitudinal direction of the cultivation chamber, and is kept by closing the chamber opening with the chamber lid.

Further, it is preferable that the cultivation device further includes a transport mechanism for transporting the cultivation plate, wherein the transport mechanism has: a transporter being provided in the cultivation chamber, and being used for transporting the cultivation plate in the longitudinal direction of the cultivation chamber; and an elevator being provided adjacent to the side of the cultivation chamber where the chamber opening is provided, and being used for inserting and removing the cultivation plate through the chamber opening and for transporting the cultivation plate in the vertical direction.

Further, it is preferable that: the elevator is provided in the cultivation room; and the cultivation room has a cultivation room opening for inserting and removing the cultivation plate, and a cultivation room lid that can open and close the cultivation room opening, on one end side in the longitudinal direction, the one end side having the elevator provided thereon.

Further, it is preferable that: the nutrient solution tray arranged in the cultivation chamber and used for causing the nutrient solution to flow therein is configured with a rectangular tray that is substantially the same size as the cultivation plate and on which the cultivation plate can be arranged; and the transport mechanism transports the cultivation plate and the rectangular tray in a state where the cultivation plate is arranged on the rectangular tray.

Effects of the Invention

According to the present invention, since the air circulation device supplies air to each of the plurality of cultivation chambers arranged in the vertical direction in the closed cultivation room, a uniform cultivation environment can be provided regardless of location in the cultivation room, and since air and nutrient solution always adjusted to a predetermined condition are supplied to the cultivation chamber in the cultivation room and collected therefrom in a short time, the environment in the cultivation room can be kept almost constant.

BRIEF DESCRIPTION OF THE DRAWINGS

FIG. 5B An explanatory diagram of an artificial light source included in the cultivation device according to the first embodiment;

PREFERRED MODE FOR CARRYING OUT THE INVENTION

Preferred embodiments of the cultivation device of the present invention is described blow with reference to the drawings. The cultivation device of the present invention is used in an artificial light plant factory, and is suitably used in a plant factory having a large production scale where it has conventionally been difficult to govern the cultivation environment.

First Embodiment

A cultivation device 1A of a first embodiment is described with reference to FIGS. 1 to 7.

5

Figure 1:
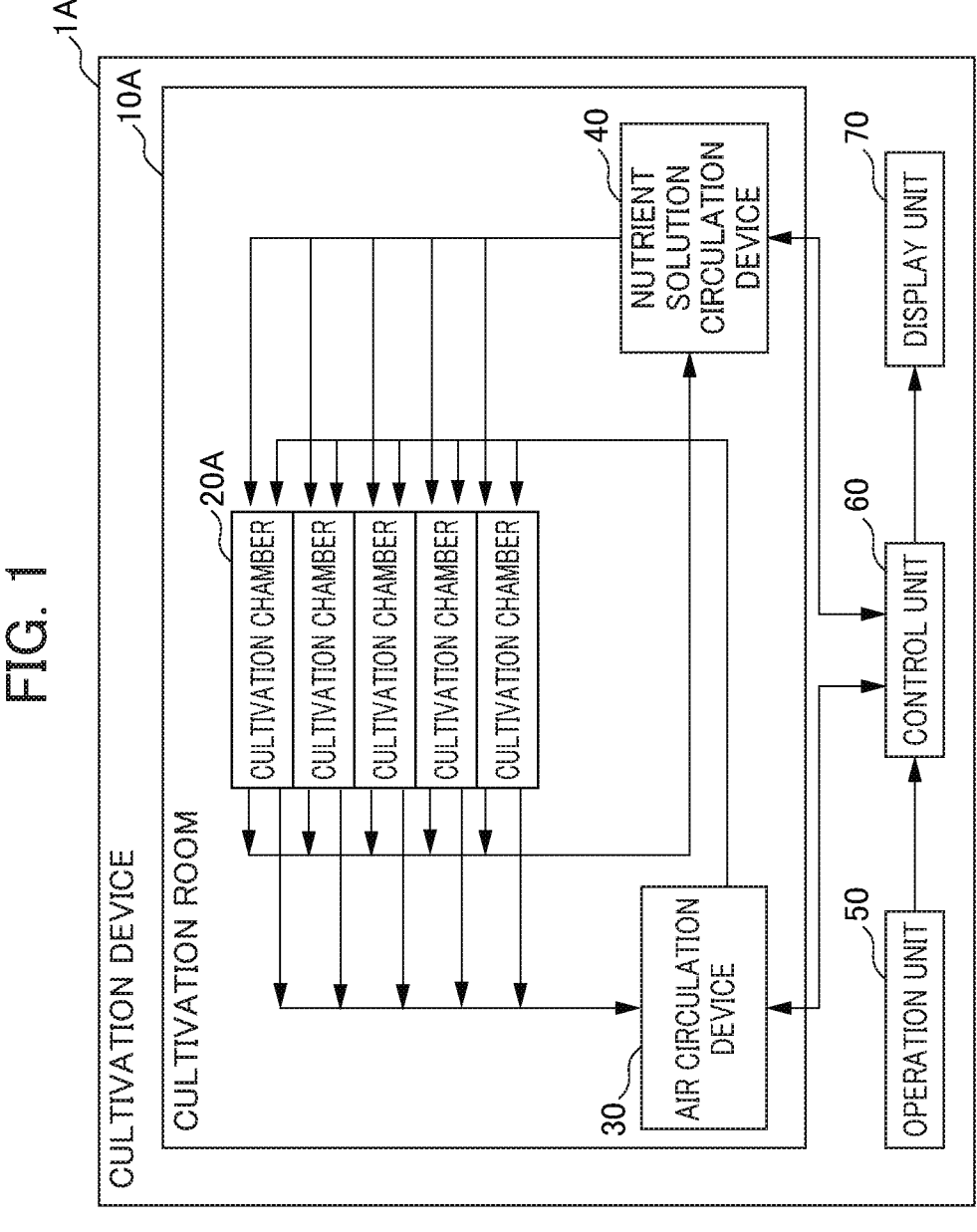
FIG. 1 A functional block diagram showing a configuration of a cultivation device according to a first embodiment of the present invention.

FIG. 1 is a functional block diagram showing the configuration of the cultivation device 1A of the present invention. The cultivation device 1A includes a cultivation room 10A, a plurality of cultivation chambers 20A, an air circulation device 30, a nutrient solution circulation device 40, an operation unit 50, a control unit 60, and a display unit 70.

Figure 2:
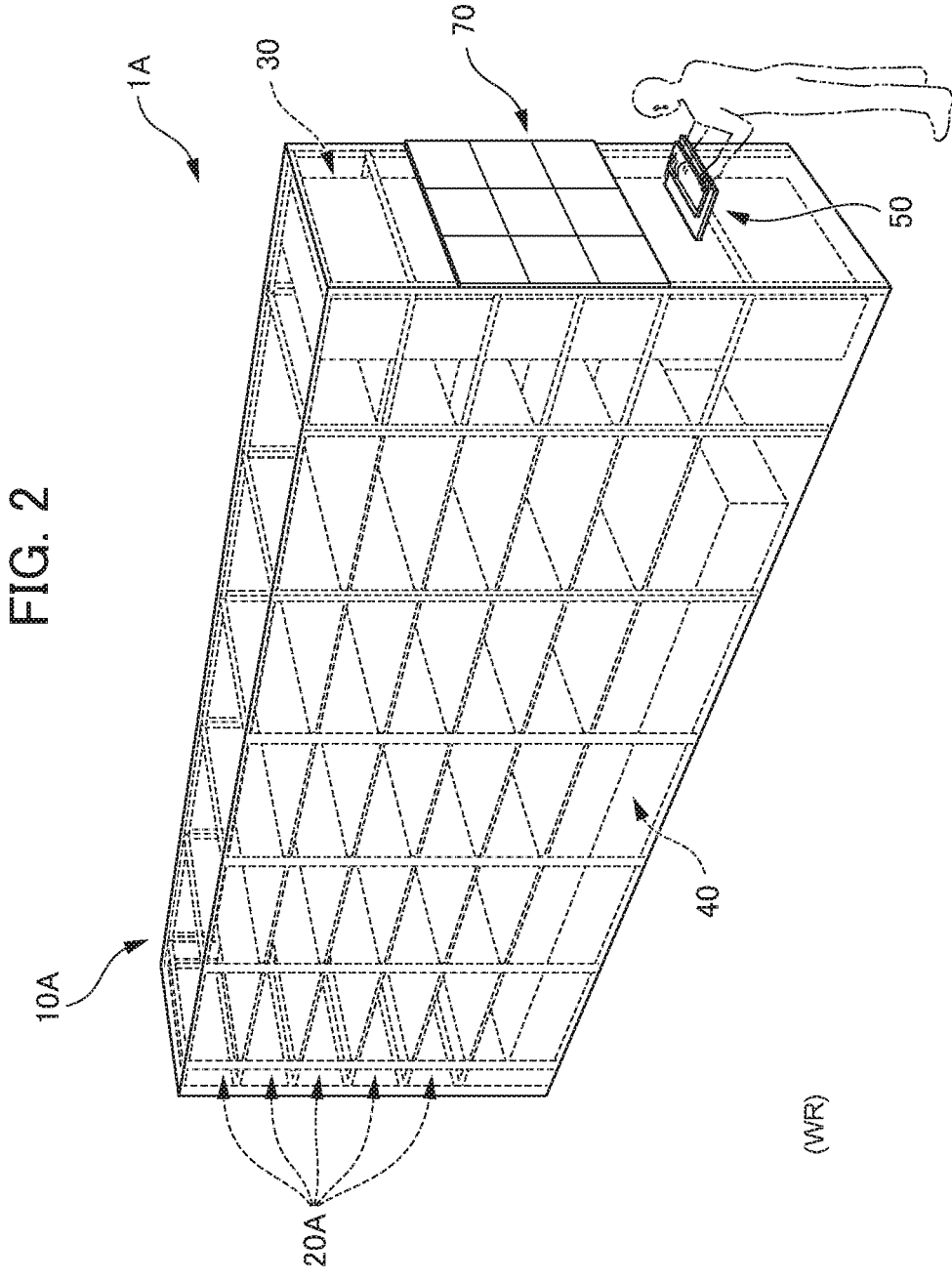
FIG. 2 A diagram showing the appearance of the cultivation device according to the first embodiment.
Figure 3:
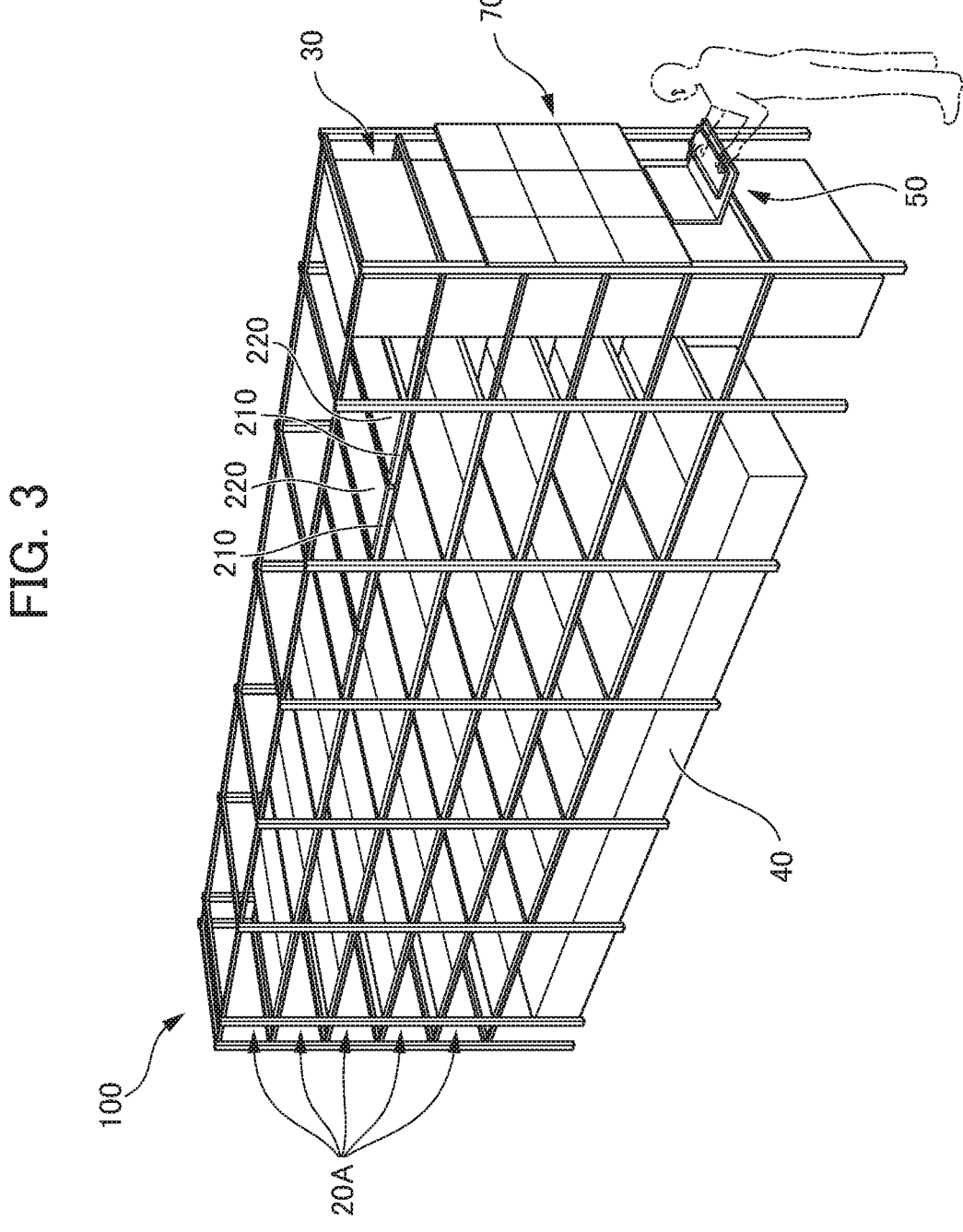
FIG. 3 A diagram showing the inside of the cultivation device according to the first embodiment.

As shown in FIG. 2, the cultivation room 10A includes a rectangular parallelepiped outer wall having a closable inside, and can maintain a cultivation environment independent from the environment (temperature and humidity) in the work room of the plant factory in which the cultivation device 1A is arranged. As the material of the outer wall, it is preferable to use a heat insulating material not to be affected by the environment in the work room WR outside the cultivation room 10A. FIG. 3 shows the cultivation device 1A in a state where the outer wall of the cultivation room 10A is removed.

Figure 4:
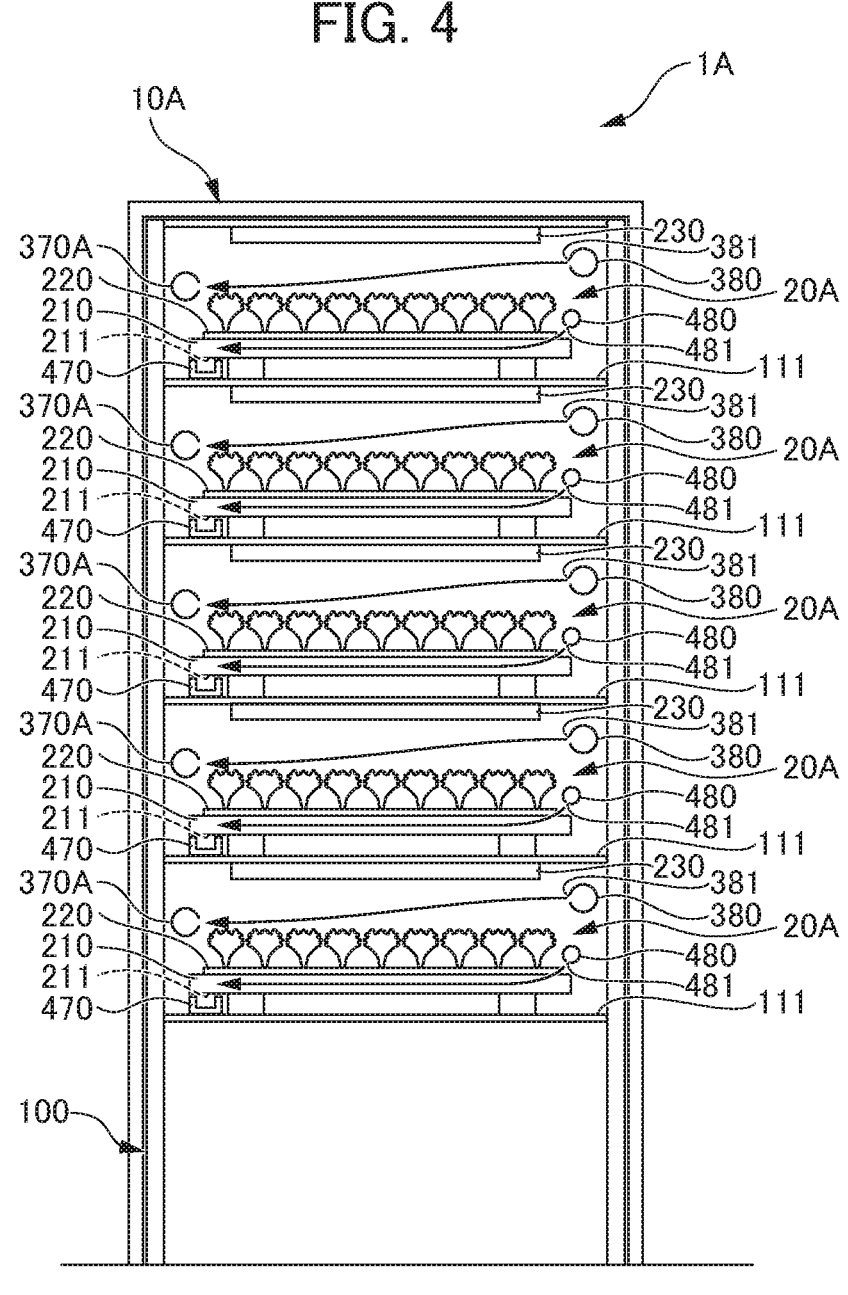
FIG. 4 A schematic cross-sectional view of a cultivation room included in the cultivation device according to the first embodiment as viewed from the longitudinal direction.

FIG. 4 shows a schematic cross-sectional view of the cultivation room 10 of the present invention as viewed from the longitudinal direction.

As shown in FIG. 4, the plurality of cultivation chambers 20A are defined by dividing the cultivation room 10A in the vertical direction by shelf boards 111 at predetermined intervals, and each of them has a substantially rectangular parallelepiped shape. The plurality of cultivation chambers 20A can be configured by providing an exterior on a conventionally known multi-stage cultivation shelf. In this embodiment, the cultivation chamber 20A is configured by providing an exterior (outer wall of the cultivation room 10A) on a five-stage cultivation shelf 100.

Figure 5A:
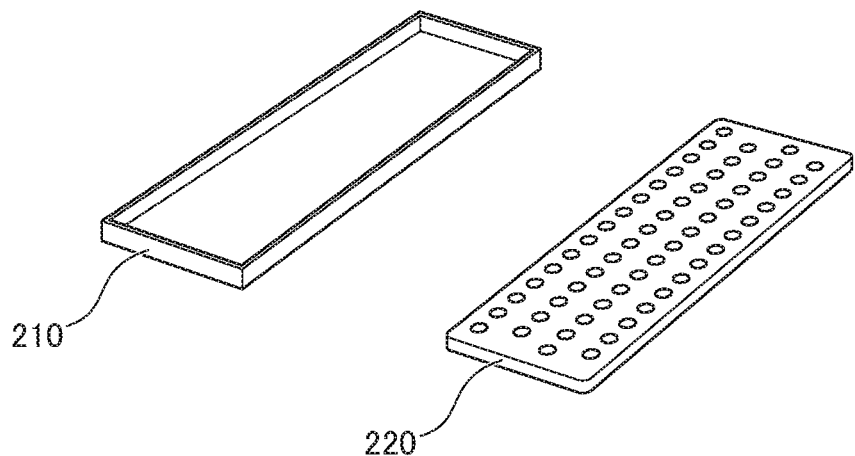
FIG. 5A An explanatory diagram of a cultivation plate and a cultivation tray arranged in the cultivation device according to the first embodiment.
Figure 5B:
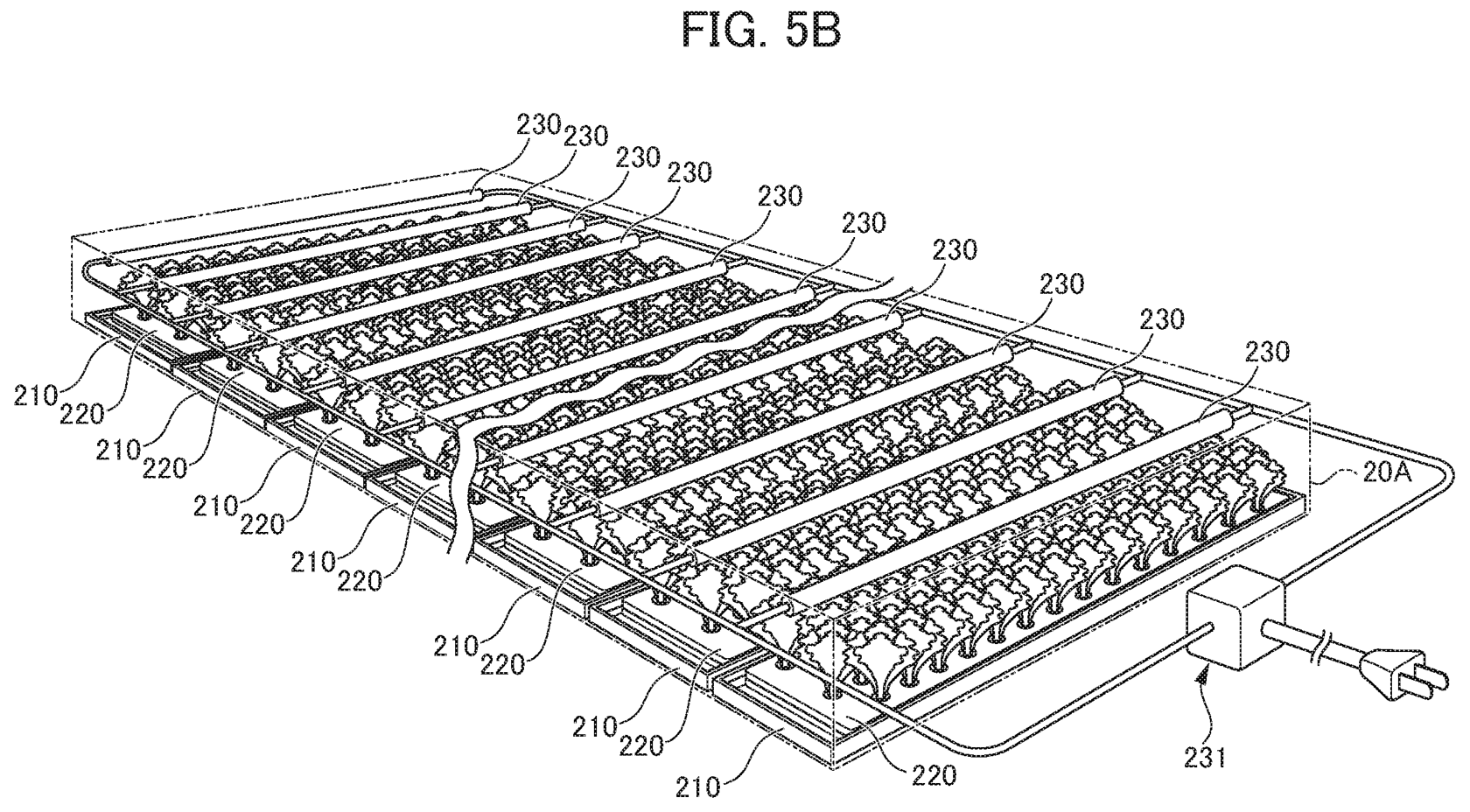

In each cultivation chamber 20A, a plurality of nutrient solution trays 210 and cultivation plates 220 as shown in FIG. 5A are arranged so that the transverse direction of them is along the longitudinal direction of the cultivation chamber 20A, as shown in FIG. 5B. The nutrient solution tray 210 has substantially the same size as the rectangular cultivation plate 220, and is configured with a rectangular tray into which the cultivation plate 220 can be arranged so as to be fitted. In this embodiment, 16 nutrient solution trays 210 having a size of about 30 cm×120 cm, each of which has the cultivation plate 220 fitted therein, are arranged in each cultivation chamber 20A (see FIG. 5B).

It should be noted that the shape of the cultivation chamber 20A is preferably a long shape in which the length in the longitudinal direction is more than twice the length in the transverse direction so that the cultivation chamber 20A is suitably used in a plant factory having a large production scale. In this embodiment, the length in the transverse direction: the length in the longitudinal direction=1:5. However, the size of the cultivation chamber 20A (the number of cultivation plates 220 arranged in the cultivation chamber 20A) is not limited to the size of the above-described embodiment.

Further, in this embodiment, the nutrient solution tray 210 and the cultivation plate 220 are rectangular, but the present invention is not limited to this and they may be square. In the case of a square, one side of the square cultivation plate 220 is arranged along the longitudinal direction of the cultivation chamber 20A.

Thus, in the state where the nutrient solution tray 210 is arranged, each of the plurality of cultivation chambers 20 is in a closed or semi-closed state.

Further, in the nutrient solution tray 210, a discharge port 211 (see FIG. 4) for discharging the supplied nutrient solution is formed on one end side (downstream side of the nutrient solution flow) in the longitudinal direction. Further, the nutrient solution tray 210 includes an inclined surface that inclines at a predetermined angle (for example, about 1 degree) in the transverse direction of the cultivation chamber 20A so that the downstream side of the nutrient solution flow is lower. This can create a unidirectional flow at a predetermined flow velocity according to the supply flow rate without stagnancy of the supplied nutrient solution in the nutrient solution tray 210. Further, a nutrient solution collection pipe 470 to be described below is arranged below the discharge port 211 (see FIG. 4).

The nutrient solution tray 210 does not have to have a size corresponding to one cultivation plate 220, and may be configured so that a plurality of cultivation plates 220 can be arranged in one nutrient solution tray 210.

Further, as shown in FIG. 5B, artificial light sources 230 are arranged above each cultivation chamber 20A, and a dimmer 231 for dimming the artificial light source 230 is connected. In this embodiment, two artificial light sources 230 are arranged along the longitudinal direction of the nutrient solution tray 210 and the cultivation plate 220 (the transverse direction of the cultivation chamber 20A). As the artificial light source 230, an LED that consumes less power and can be configured to be thin is suitably used. Moreover, a fluorescent lamp may be used as an artificial light source.

As shown in FIGS. 2 and 3, the air circulation device 30 is arranged adjacent to the cultivation shelf 100 on one end side in the longitudinal direction of the cultivation room 10. The air circulation device 30 supplies the air adjusted to a predetermined condition to each cultivation chamber 20A at a predetermined flow velocity, collects the air that has passed through the inside of each cultivation chamber 20A to adjust it to meet the predetermined condition, and repeats this procedure to circulate and supply the air.

Figure 6:
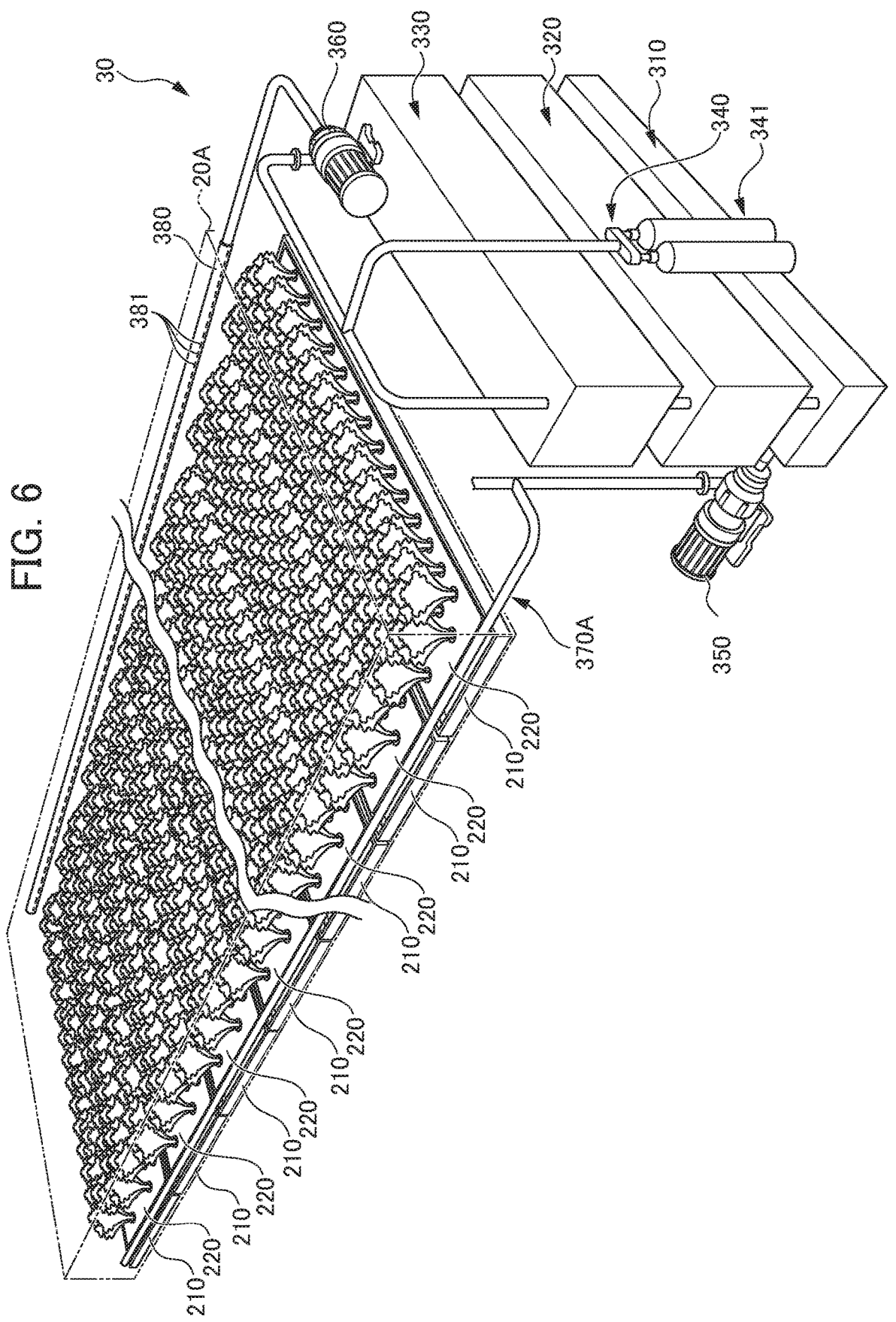
FIG. 6 An explanatory diagram of an air circulation device included in the cultivation device according to the first embodiment.

The configuration of the air circulation device 30 is described below with reference to FIG. 6. It is sufficient that the air circulation device 30 has at least a function of adjusting temperature, humidity, carbon dioxide concentration, and air flow velocity (flow rate). In this embodiment, the air circulation device 30 includes: an air sterilizer 310; an air conditioner 320 of a direct expansion system (with a method where the air is cooled directly with a refrigerant) that has warming, cooling, and dehumidifying functions; a humidifier 330 with a humidifying function; a carbon dioxide supply device 340 that adjusts the carbon dioxide concentration; a suction pump 350; and a compression pump 360.

As a device having a function of adjusting the temperature, a chiller device of an indirect expansion system (with a method where the air is cooled via water with a refrigerant) may be used.

Each cultivation chamber 20A and the air circulation device 30 are connected via an air collection pipe 370A and an air supply pipe 380. The air collection pipe 370A and the air supply pipe 380 extend in the longitudinal direction of the cultivation chamber 20. A plurality of air collection ports 371 provided at predetermined intervals are formed in the air collection pipe 370A. Further, the air supply pipe 380 is formed with a plurality of air supply ports 381 provided at predetermined intervals, and these air supply ports 381 are provided with flow regulating valves (not shown).

Further, a temperature sensor, a humidity sensor and a carbon dioxide concentration sensor (not shown) are attached to predetermined locations in each cultivation chamber 20A, and the temperature, humidity and carbon dioxide concentration of the circulating air are monitored.

The air collected from each cultivation chamber 20A by the suction pump 350 via the air collection pipe 370A is sterilized through the air sterilizer 310 and sent to the air conditioner 320. In the air conditioner 320, after temperature adjustment and dehumidification according to the measurement results of the temperature sensor and the humidity sensor, the humidifier 330 humidifies the air. After that, the carbon dioxide supply device 340 supplies carbon dioxide from the carbon dioxide supply source 341 such as a carbon dioxide cylinder according to the measurement result of the carbon dioxide concentration sensor. Then, the compression pump 360 supplies air adjusted to a predetermined condition and a predetermined flow velocity to each cultivation chamber 20A through the air supply pipe 380.

The set value of the air flow velocity may be fixed or changeable.

At this time, as shown in FIG. 4, the air flow direction in the cultivation chamber 20A is along the transverse direction of the cultivation chamber 20A. As a result, the time from air supply to collection can be shortened as compared with the case where the air is supplied so that the flow direction is along the longitudinal direction of the cultivation chamber 20A. Therefore, it is possible to reduce changes in the cultivation environment such as temperature, humidity, and carbon dioxide concentration that is generated between the upstream side and the downstream side of the air flow.

However, the present invention is not limited to this, and the air flow direction in the cultivation chamber 20A may be along from the upper side to the lower side of the cultivation chamber 20A.

Here, in this embodiment, one cultivation device 1A includes one cultivation room 10A, and one cultivation room 10A includes a plurality of cultivation chambers 20A and one air circulation device 30, in which the air is sent from one air circulation device 30 to the plurality of cultivation chambers 20A.

However, the present invention is not limited to this, and there may be a configuration in which one cultivation device 1A includes one cultivation room 10A, and one cultivation room 10A includes a plurality of cultivation chambers 20A and a plurality of air circulation devices 30 corresponding to each cultivation chamber 20, in which the air is sent from the corresponding air circulation device 30 to each of the plurality of cultivation chambers 20A. In this case, the temperature, humidity, carbon dioxide concentration, flow velocity (flow rate), and the like of the circulating air can be changed for each of the cultivation chambers 20A.

Further, one cultivation device 1A may include a plurality of cultivation rooms 10A, and each of the plurality of cultivation rooms 10A may include a plurality of cultivation chambers 20A and one air circulation device 30.

Further, one cultivation device 1A may include a plurality of cultivation rooms 10A, and each of the plurality of cultivation rooms 10A may include a plurality of cultivation chambers 20A and a plurality of air circulation devices 30 corresponding to the respective cultivation chambers 20.

The nutrient solution circulation device 40 is arranged below the cultivation room 10A as shown in FIGS. 2 and 3. The nutrient solution circulation device 40 supplies the nutrient solution adjusted to the predetermined condition to the nutrient solution tray 210 of each cultivation chamber 20A at a predetermined flow velocity, collects the nutrient solution that has passed through each nutrient solution tray and adjusts it to meet the predetermined condition, and repeats this procedure to circulate and supply the nutrient solution.

Figure 7:
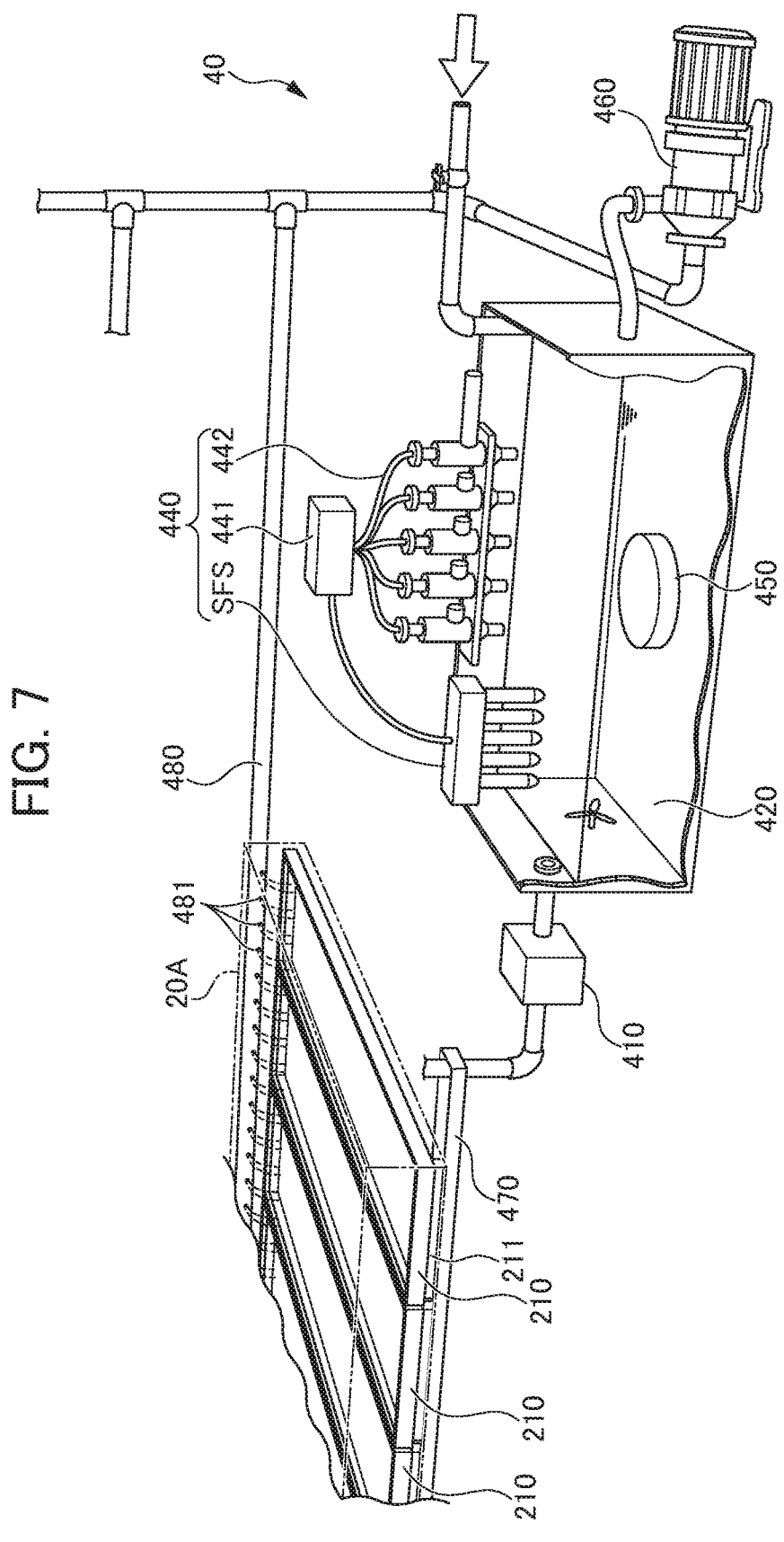
FIG. 7 An explanatory diagram of a nutrient solution circulation device included in the cultivation device according to the first embodiment.

The configuration of the nutrient solution circulation device 40 is described below with reference to FIG. 7. It is sufficient that the nutrient solution circulation device 40 has at least a function of adjusting the temperature of the nutrient solution and nutrients (various straight fertilizer ions such as nitrogen, phosphoric acid, and potassium). In this embodiment, the nutrient solution circulation device 40 includes: a nutrient solution sterilizer 410; a nutrient solution tank 420 connected to the city water supply source; a chiller device with warming and cooling functions (not shown); a nutrient supply device 440; an oxygen supply device 450 that supplies oxygen to adjust the dissolved oxygen concentration; and a pressure pump 460 for the nutrient solution.

Each cultivation chamber 20A and the nutrient solution circulation device 40 are connected through a nutrient solution collection pipe 470 and a nutrient solution supply pipe 480. The nutrient solution collection pipe 470 extends in the longitudinal direction of the cultivation chamber 20A, and is configured so that the nutrient solution discharged from the discharge port of the nutrient solution tray 210 can be collected. Further, the nutrient solution supply pipe 480 also extends in the longitudinal direction of the cultivation chamber 20, and the nutrient solution supply pipe 480 has a plurality of nutrient solution supply ports 481 formed at predetermined intervals. The nutrient solution supply port 481 may be opened in the nutrient solution supply pipe 480 so as to face downward, but it is preferably opened so as to face the direction along the flow direction of the nutrient solution as in this embodiment (See FIGS. 4 and 7). As a result, the flow velocity of the nutrient solution can be increased for the same supply amount as compared with the case of opening downward.

Here, in this embodiment, one cultivation device 1A includes one cultivation room 10A, and one cultivation room 10A includes a plurality of cultivation chambers 20A and one nutrient solution circulation device 40, in which the nutrient solution is sent from one nutrient solution circulation device 40 to the plurality of cultivation chambers 20A.

Further, the set value of the flow velocity of the nutrient solution may be fixed or changeable.

However, the present invention is not limited to this, and there may be a configuration in which one cultivation device 1A includes one cultivation room 10A, and one cultivation room 10A includes a plurality of cultivation chambers 20A and a plurality of nutrient solution circulation devices 40 corresponding to each cultivation chamber 20, in which the nutrient solution is sent from the corresponding nutrient solution circulation device 40 to each of the plurality of cultivation chambers 20A. In this case, the temperature, nutrients, flow velocity and the like of the nutrient solution can be changed for each cultivation chamber 20A.

Further, one cultivation device 1A may include a plurality of cultivation rooms 10A, and each of the plurality of cultivation rooms 10A may include a plurality of cultivation chambers 20A and one nutrient solution circulation device 40.

Further, one cultivation device 1A may include a plurality of cultivation rooms 10A, and each of the plurality of cultivation rooms 10A may include a plurality of cultivation chambers 20A and a plurality of nutrient solution circulation devices 40 corresponding to the respective cultivation chambers 20.

Further, a water temperature sensor (not shown) is attached to the nutrient solution tank 420, and a straight fertilizer sensor SFS for measuring the concentration of various nutrients is attached in the vicinity of the connection port of the nutrient solution tank 420 with the nutrient solution collection pipe 470. They monitor the water temperature of the nutrient solution in circulation and the concentration of various straight fertilizer ions. The chiller device adjusts the temperature of the nutrient solution according to the measurement result of the water temperature sensor.

The nutrient supply device 440 is configured to include a straight fertilizer ion concentration control unit 441, a straight fertilizer sensor SFS, and a straight fertilizer ion supply plunger 442. Then, in this nutrient supply device 440, the straight fertilizer ion concentration control unit 441 drives the straight fertilizer ion supply plunger 442 according to the measurement results of various straight fertilizer sensors SFS to adjust the straight fertilizer ion concentration of the nutrient solution. The straight fertilizer ion concentration of the nutrient solution may be measured using a pH sensor and an EC sensor.

The nutrient solution stored in the nutrient solution tank 420 is adjusted to a predetermined water temperature by a chiller device, is adjusted to a predetermined straight fertilizer ion concentration by a nutrient supply device 440, and is adjusted by the oxygen supply device 450 to have a predetermined amount of dissolved oxygen. After that, the nutrient solution pressure pump 460 supplies the nutrient solution to the nutrient solution trays 210 arranged in each cultivation chamber 20A through the nutrient solution supply pipe 480. As shown in FIG. 4, the nutrient solution flows through the nutrient solution tray 210 at a predetermined flow velocity along the transverse direction of the cultivation chamber 20A, is discharged from the discharge port 211 of the nutrient solution tray 210, and flows into the nutrient solution collection pipe 470. The nutrient solution collected by the nutrient solution collection pipe 470 connected to each cultivation chamber 20A is sterilized by the nutrient solution sterilizer 410 and then flows into the nutrient solution tank 420.

At this time, the flow direction of the nutrient solution in the cultivation chamber 20A is along the transverse direction of the cultivation chamber 20A. As a result, the time from supply to collection of the nutrient solution can be shortened as compared with the case where the flow direction of the nutrient solution is along the longitudinal direction of the cultivation chamber 20A.

One nutrient solution tank 420 may be provided for each cultivation chamber 20A, or only one may be provided for each cultivation room 10.

The operation unit 50 is configured with buttons, a keyboard, and the like for setting the inside of the cultivation room 10 to be in a predetermined cultivation environment, and as shown in FIGS. 1 and 2, is arranged outside the one end side (the side where the air circulation device 30 is arranged) in the longitudinal direction of the cultivation room 10.

The control unit 60 is arranged inside the cultivation room 10. The control unit 60 receives signals from the air circulation device 30, the nutrient solution circulation device 40, and the operation unit 50 to control the air circulation device 30, the nutrient solution circulation device 40, and the display unit 70 to described below, and is configured with, for example, a central processing unit, a computer device including a RAM, a ROM, or the like.

The display unit 70 is used for displaying the measurement results monitored by various sensors in each cultivation chamber 20 in the cultivation room 10, or the predetermined cultivation environment set by the operation unit 50, and is configured with a liquid crystal panel or the like. As shown in FIGS. 2 and 3, the display unit 70 is arranged outside the one end side (the side where the air circulation device 30 is arranged) in the longitudinal direction of the cultivation room 10.

Note that the operation unit 50, the control unit 60, and the display unit 70 may be configured separately from the cultivation room 10 instead of being integrally configured with the cultivation room 10. In that case, a control panel including an operation unit, a control unit, and a display unit may be arranged at a predetermined location in the plant factory, and the control panel may centrally govern the cultivation environment of a plurality of cultivation chambers 20 in each of the plurality of cultivation rooms 10.

According to the cultivation device 1A of the present invention described above, the following effects are exhibited.

(1) The cultivation device 1A used in an artificial light plant factory includes: a rectangular parallelepiped cultivation room 10A having a closable inside; a plurality of rectangular parallelepiped cultivation chambers 20A defined by dividing the cultivation rooms 10A in the vertical direction at predetermined intervals; an air circulation device 30 which supplies air adjusted to a predetermined condition to each of the plurality of cultivation chambers 20A at a predetermined flow velocity and collects the supplied air from the plurality of cultivation chambers 20A to circulate the air; and a nutrient solution circulation device 40 which supplies a nutrient solution adjusted to a predetermined condition to each of the plurality of cultivation chambers 20A at a predetermined flow velocity and collects the supplied nutrient solution from the plurality of cultivation chambers 20A to circulate the nutrient solution.

As a result, the air is supplied by the air circulation device 30 to each of the plurality of cultivation chambers 20A arranged in the vertical direction in the closed cultivation room 10A, so that a uniform cultivation environment can be provided in the cultivation room 10A regardless of the location.

Further, since the cultivation room 10A has a closable structure, when the cultivation device 1A of the present invention is arranged in a work room where a person works in a plant factory, the environment inside the cultivation room 10A and the work room can be set to be independent. Therefore, unlike the work room in a conventional plant factory, it is not necessary for the plants and humans to coexist. This allows the environment in the cultivation room 10A to be set, for example, to be optimum cultivation conditions for plants, which is not necessarily suitable for the human body. Further, since the cultivation device 1A of the present invention can independently set the optimum cultivation environment for each device 1A, it is possible to cultivate plants having different cultivation conditions in one work room of a plant factory. Further, the cultivation room 10A is made a closed type, so that the temperature and humidity can be governed inside the cultivation room 10A without affection by the temperature and humidity inside the plant factory. Therefore, since the conditions to govern environment inside the plant factory can be set relaxed, the plant factory can be a larger size.

(2) The flow directions of the air and the nutrient solution supplied to the cultivation chamber 20A, respectively by the air circulation device 30 and the nutrient solution circulation device 40, are along the transverse direction of the cultivation chamber 20A. As a result, air and nutrient solution adjusted to a predetermined condition are always supplied to the cultivation chamber 20A in the cultivation room 10, flow in the transverse direction of the cultivation chamber 20A, and are collected in a short time, thereby reducing changes in the cultivation environment between the upstream side and the downstream side. This can reduce changes in the environment (changes in temperature or humidity) with time inside the cultivation room 10A. As a result, an optimum and uniform cultivation environment for plant growth can be kept, and productivity of the plant factory can be improved.

(3) The cultivation device 1A includes a plurality of rectangular cultivation plates 220, and the plurality of cultivation plates 220 are arranged in the cultivation chamber 20A so that the transverse direction is along the longitudinal direction of the cultivation chamber 20A. This can reduce changes in the cultivation environment even in a long cultivation device 1A (cultivation chamber 20A) in which a plurality of cultivation plates 220 can be arranged, because the air and nutrient solution flow in the transverse direction. Therefore, it is possible to efficiently produce a large amount of plants in a cultivation chamber in which the environment is uniformly controlled.

(4) The cultivation device 1A includes a nutrient solution tray 210 for causing the nutrient solution to flow therein, which is arranged in the cultivation chamber 20, and the nutrient solution tray 210 includes an inclined surface inclining at a predetermined angle in the transverse direction of the cultivation chamber 20A so that the downstream side of the nutrient solution flow is lower. This can cause the nutrient solution to flow in the transverse direction at a predetermined flow velocity without stagnancy along the transverse direction of the cultivation chamber 20A. For example, the nutrient solution tray can be configured to be shallower as compared with the case where the nutrient solution flows in the longitudinal direction with an inclination in the longitudinal direction. This can lower the height of the cultivation chamber 20A to save the space. So, if the cultivation chambers 20A are arranged in the same space, the number of stages of them can be increased, and this can increase the production amount per unit area. Further, since the plant can be cultivated while the nutrient solution flows at a predetermined flow velocity, the root of the plant can be always kept in contact with the new nutrient solution. Therefore, the growth of plants can be further promoted, and the production efficiency of plants can be improved.

(5) The nutrient solution rectangular tray trays 210 of the cultivation device 1A is configured with a rectangular tray 210, having each have substantially the same size as the cultivation plate 220, on which the cultivation plate 220 can be arranged. The plurality of nutrient solution rectangular trays 210 are arranged in the cultivation chamber 20A so that the transverse direction is along the longitudinal direction of the cultivation chamber 20A. As a result, the nutrient solution trays are in a state in which they are partitioned along the transverse direction of the cultivation chamber 20A, so that the supplied nutrient solution can easily flow along the transverse direction of the cultivation chamber 20A.

Second Embodiment

A cultivation device 1B of a second embodiment is described below with reference to FIGS. 8 to 13.

The cultivation device 1B according to the second embodiment is different from the one according to the first embodiment in the configuration of the cultivation room, the configuration of the cultivation chamber, and the configuration of the air collection pipe connecting the cultivation chamber and the air circulation device, and is also different from the first embodiment in that it further includes a transport mechanism for transporting the cultivation plate. In this embodiment, a configuration different from that of the first embodiment is described in detail, and the equivalent configurations are given the same reference numerals and the description thereof is omitted.

Figure 8:
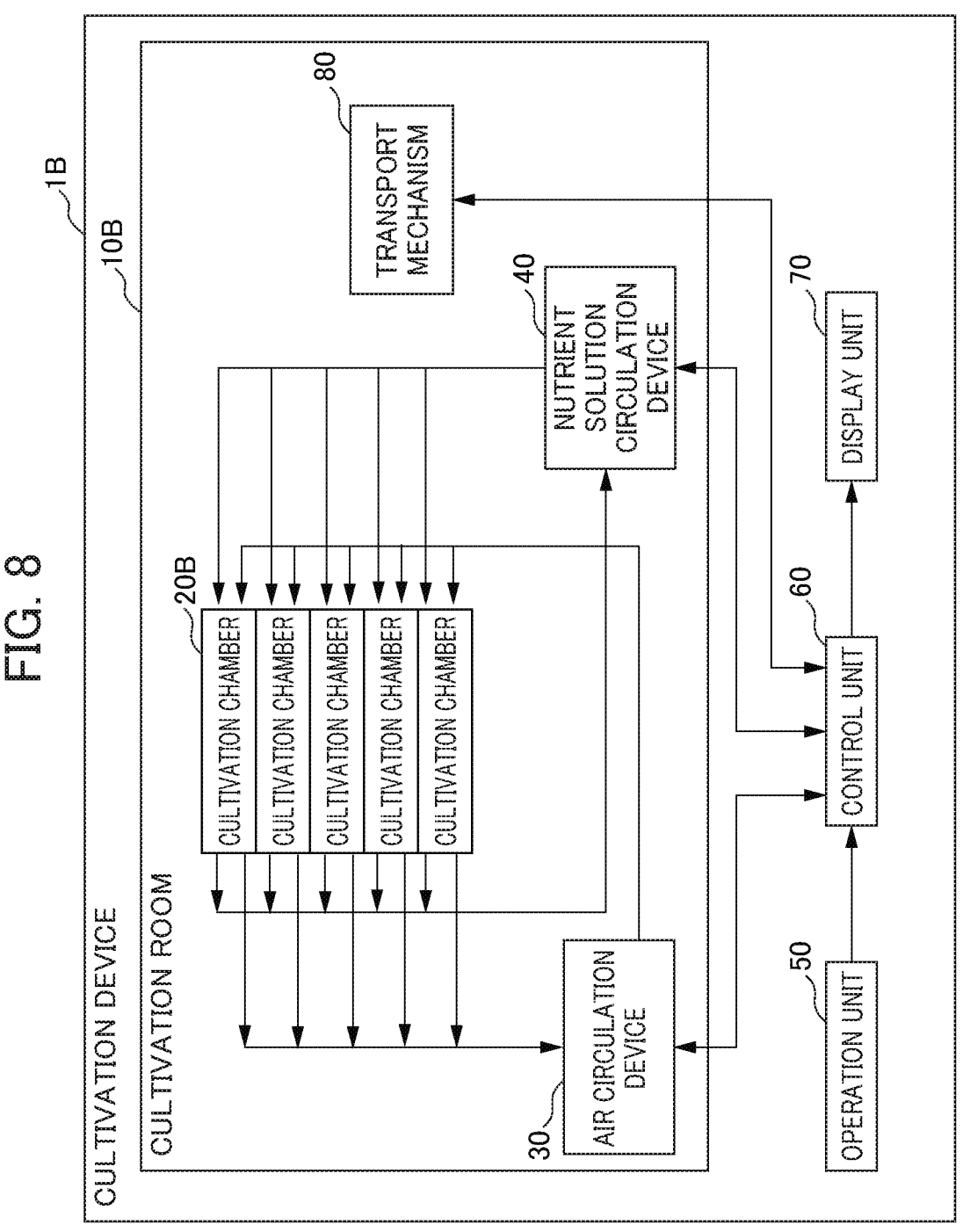
FIG. 8 A functional block diagram showing a configuration of a cultivation device according to a second embodiment of the present invention.
Figure 9:
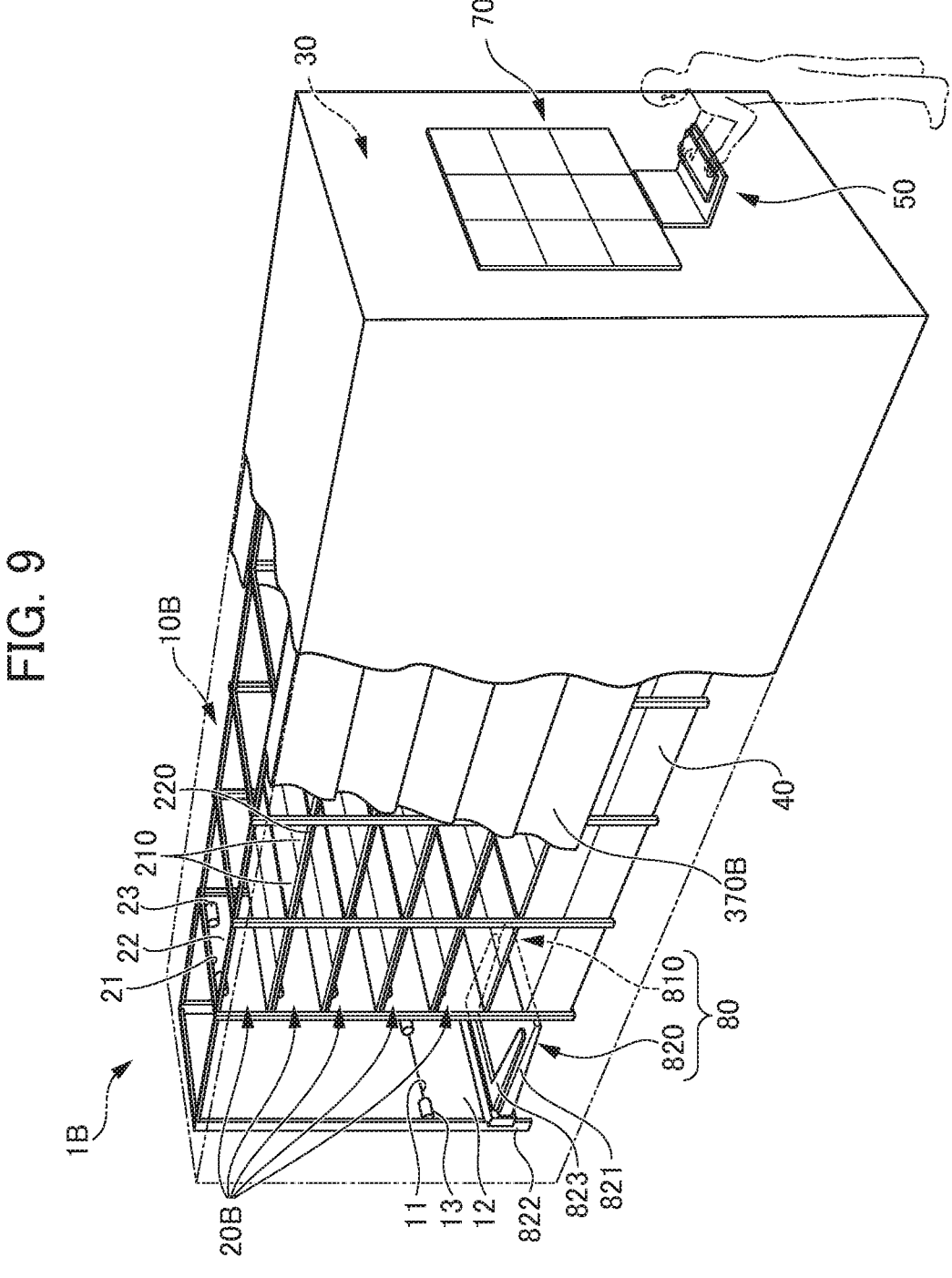
FIG. 9 A diagram showing the appearance of the cultivation device according to the second embodiment.

FIG. 8 is a functional block diagram showing the configuration of a cultivation device 1B of the present invention. FIG. 9 is a perspective view showing the cultivation device 1B.

The cultivation device 1B includes a cultivation room 10B, a plurality of cultivation chambers 20B, an air circulation device 30, a nutrient solution circulation device 40, an operation unit 50, a control unit 60, a display unit 70, and a transport mechanism 80.

The cultivation room 10B is configured in a rectangular parallelepiped shape in which a plurality of box-shaped cultivation chambers 20B are stacked in the vertical direction. As a result, each of the plurality of cultivation chambers 20B is configured so that the inside can be closed, and can maintain a cultivation environment independent from the environment (temperature and humidity) of the work room of the plant factory in which the cultivation device 1B is arranged. As the material of the cultivation chamber 20B, it is preferable to use a heat insulating material not to be affected by the environment in the work room outside the cultivation room 10B. In this embodiment, the cultivation room 10B is configured to include a five-stage cultivation chamber 20B.

Figure 12:
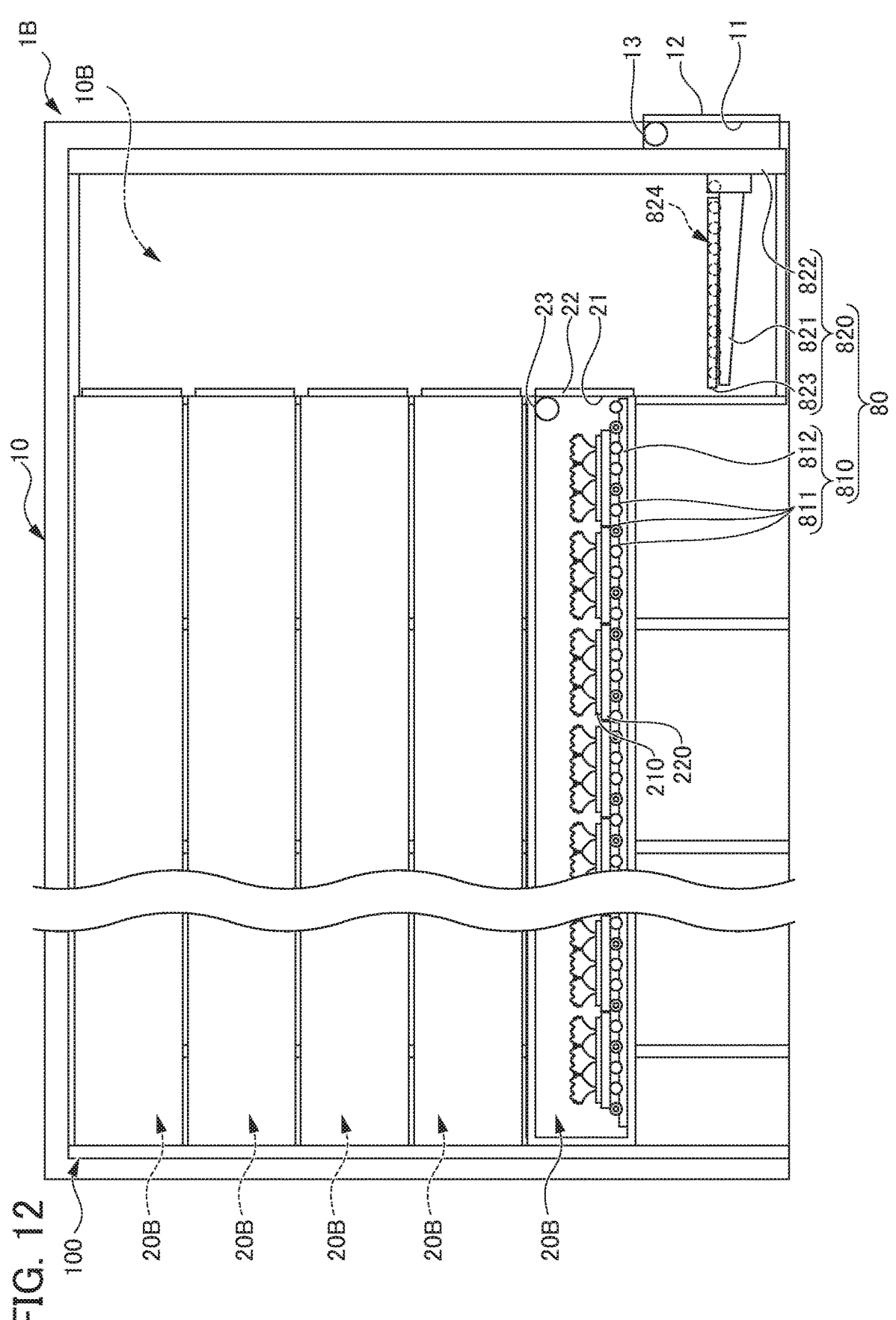
FIG. 12 A schematic view for explaining the configuration of the transport mechanism according to the second embodiment.

Further, in a bottom part of one end side in the longitudinal direction of the cultivation room 10B (the side opposite to the side where the air circulation device 30 is provided), there is provided a cultivation room opening 11 for inserting and removing the nutrient solution tray 210 and the cultivation plate 220, and a cultivation room lid 12 for opening and closing the opening 11 (see FIGS. 9 and 12). As an example, the cultivation room lid 12 is configured to be openable and closable by an electric-powered hinge 13.

The cultivation room lid 12 is opened only for the time of inserting and removing the nutrient solution tray 210 and the cultivation plate 220, and is kept closed for the rest of the time, so that the cultivation room 10B can be kept closed.

Figure 10:
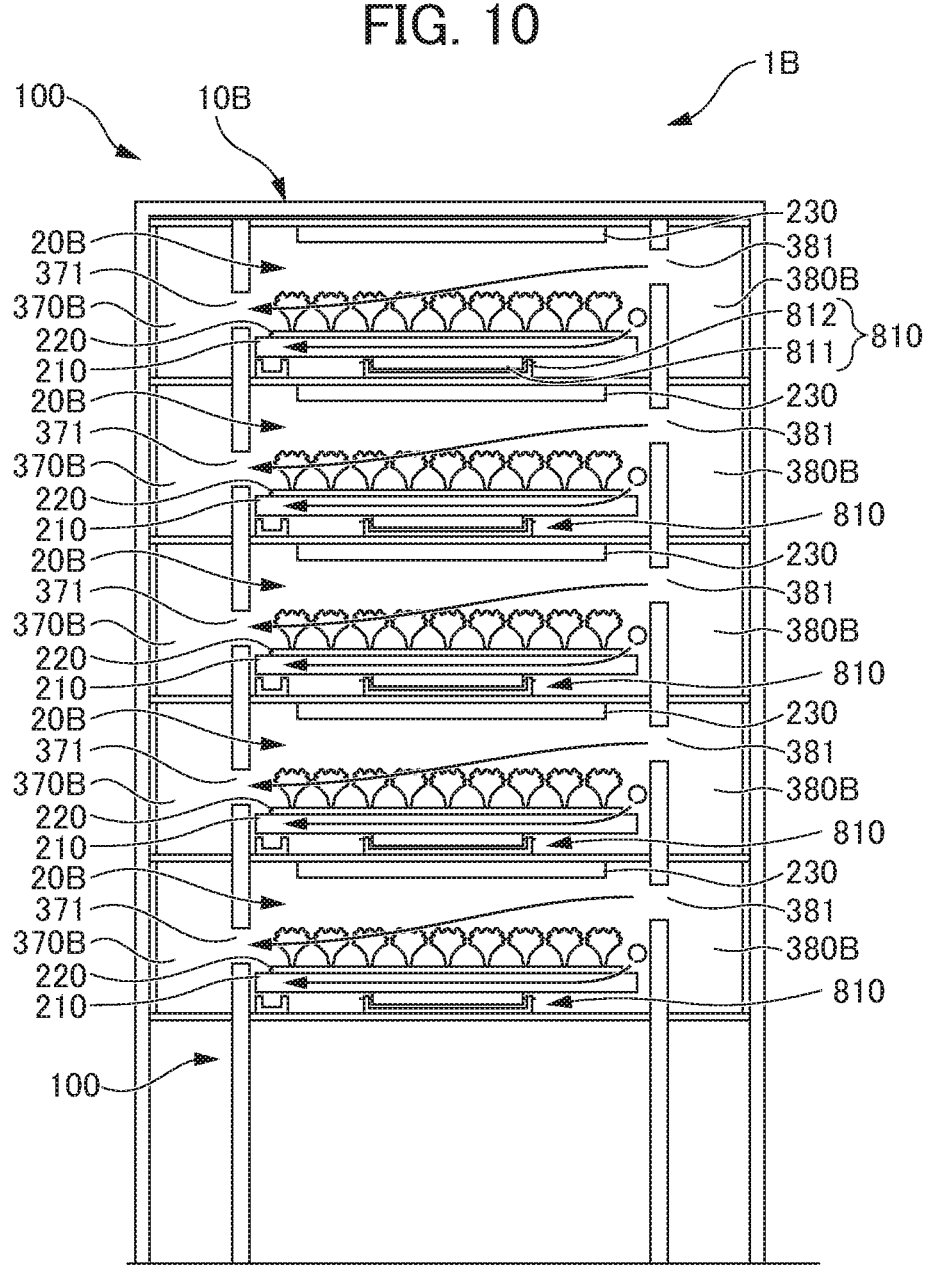
FIG. 10 A schematic cross-sectional view of a cultivation room included in the cultivation device according to the second embodiment as viewed from the longitudinal direction.

FIG. 10 shows a schematic cross-sectional view of the cultivation room 10 of the present invention as viewed from the longitudinal direction.

The plurality of cultivation chambers 20B are configured with box-shaped members having closability, and are arranged in multiple stages in the vertical direction in the cultivation room 10B. That is, the plurality of cultivation chambers 20B are defined by dividing the cultivation room 10B in the vertical direction at predetermined intervals by box-shaped members, each of which has a substantially rectangular parallelepiped shape and has closability.

Further, the cultivation chamber 20B includes a chamber opening 21 for inserting and removing the nutrient solution tray 210 and the cultivation plate 220, and a chamber lid 22 that can open and close the chamber opening 21 (see FIG. 12), on one end side in the longitudinal direction (the side opposite to the side where the air circulation device 30 is provided). As an example, the chamber lid 22 is configured to be openable and closable by an electric-powered hinge 23.

The chamber lid 22 is opened only for the time of inserting and removing the nutrient solution tray 210 and the cultivation plate 220, and is kept closed for the rest of the time, so that the cultivation chamber 20B can be kept closed. Thus, it is possible to reduce leakage of air (particularly carbon dioxide) from the cultivation chamber 20B and mixing of air into the cultivation chamber 20B as compared with the configuration in which the cultivation chambers are not closed. Therefore, in one cultivation room 10B, each of the plurality of cultivation chambers 20B can be independently controlled in different cultivation environments. Moreover, if insects, germs or the like grow in one cultivation chamber 20B out of a plurality of cultivation chambers 20B, it is possible to reduce the possibility that contamination such as insects, germs or the like spread to other cultivation chambers 20B in the same cultivation room 10B.

Further, the inner wall of the cultivation chamber 20B is preferably made of a material having a reflectance of 90% or more from the viewpoint of making the plants efficiently absorb the light. For example, the inner wall of the cultivation chamber 20B is preferably configured with a mirror surface having a reflectance of about 96% to 97%.

In each cultivation chamber 20B, a plurality of nutrient solution trays 210 and cultivation plates 220 are arranged so that their transverse directions are along the longitudinal direction of the cultivation chamber 20B, as in the case described in the first embodiment.

As in the case described in the first embodiment, the air circulation device 30 is arranged adjacent to the cultivation shelf 100 on one end side in the longitudinal direction of the cultivation room 10B. The air circulation device 30 supplies the air adjusted to a predetermined condition to each cultivation chamber 20B at a predetermined flow velocity, collects the air that has passed through the inside of each cultivation chamber 20B, and adjusts it to meet the predetermined condition, and repeat this procedure to circulate and supply the air.

Figure 11:
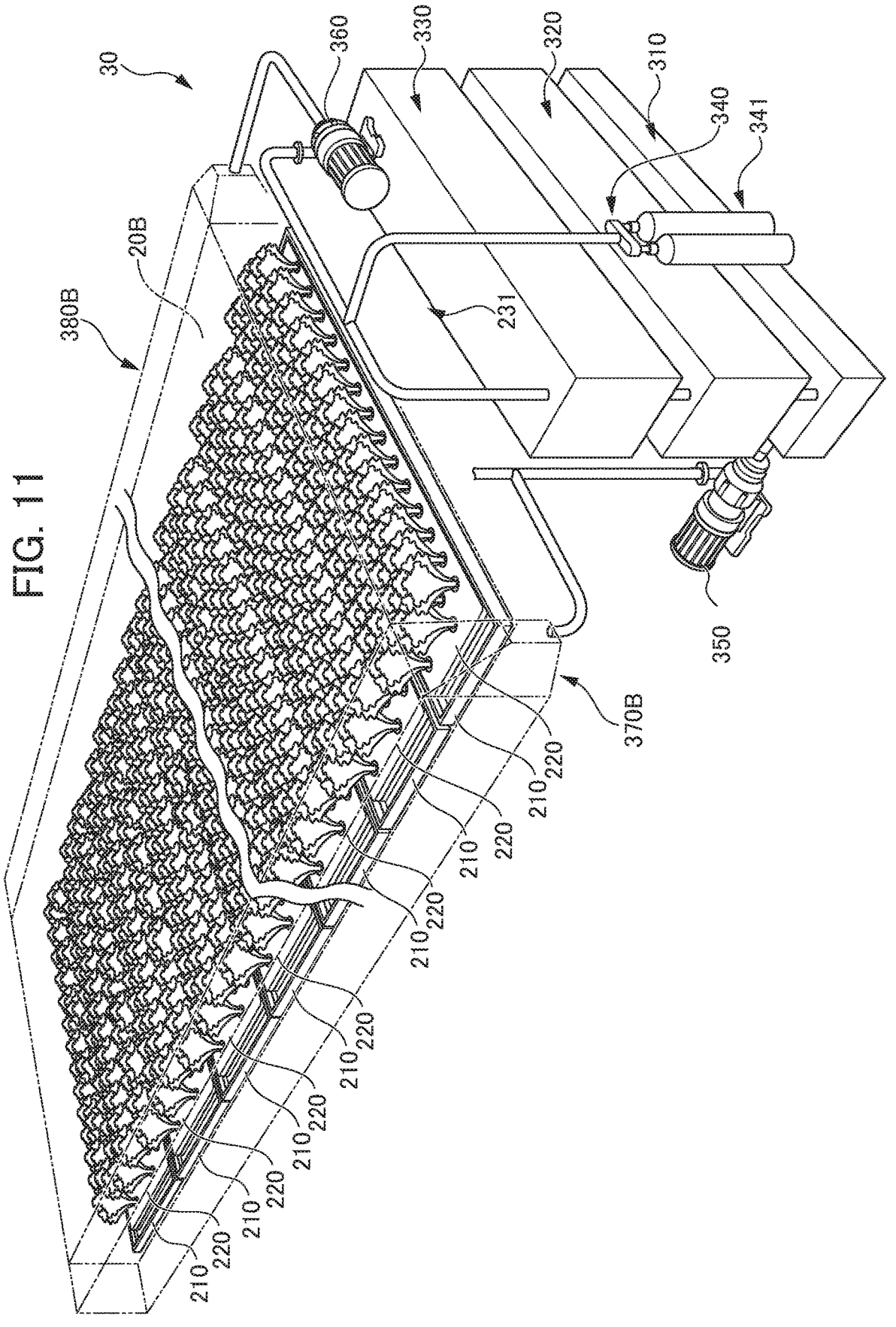
FIG. 11 An explanatory diagram of an air circulation device included in the cultivation device according to the second embodiment.

The configuration of the air circulation device 30 is described below with reference to FIG. 11. It is sufficient that the air circulation device 30 has at least a function of adjusting temperature, humidity, carbon dioxide concentration, and air flow velocity (flow rate). In this embodiment, the air circulation device 30 includes: an air sterilizer 310; an air conditioner 320 of a direct expansion system (with a method where the air is cooled directly with a refrigerant) that has warming, cooling, and dehumidifying functions; a humidifier 330 with a humidifying function; a carbon dioxide supply device 340 that adjusts the carbon dioxide concentration; a suction pump 350; and a compression pump 360.

As a device having a function of adjusting the temperature, a chiller device of an indirect expansion system (with a method where the air is cooled via water with a refrigerant) may be used.

Each cultivation chamber 20B and the air circulation device 30 are connected through an air collection duct 370B and an air supply duct 380B. The air collection duct 370B and the air supply duct 380B extend in the longitudinal direction of the cultivation chamber 20B, and the air collection duct 370B and the air supply duct 380B are arranged adjacent to the cultivation chamber 20B (see FIGS. 10 and 11). A plurality of air collection ports 371 provided at predetermined intervals are formed in the air collection duct 370B, and these air collection ports 371 are provided with a fan (not shown) for sucking the air in the cultivation chamber into the air collection duct 370B. A plurality of air supply ports 381 provided at predetermined intervals are formed in the air supply duct 380B, and these air supply ports 381 are provided with flow regulating valves (not shown).

Further, as in the case described in the first embodiment, a temperature sensor, a humidity sensor and a carbon dioxide concentration sensor (not shown) are attached to predetermined locations in the cultivation chamber 20B, and the temperature, humidity and carbon dioxide concentration of the circulating air are monitored.

The air collected from each cultivation chamber 20B by the suction pump 350 through the air collection duct 370B is sterilized through the air sterilizer 310 and sent to the air conditioner 320. In the air conditioner 320, after temperature adjustment and dehumidification according to the measurement results of the temperature sensor and the humidity sensor, the humidifier 330 humidifies the air. After that, the carbon dioxide supply device 340 supplies carbon dioxide from the carbon dioxide supply source 341 such as a carbon dioxide cylinder according to the measurement result of the carbon dioxide concentration sensor. Then, the compression pump 360 supplies the air adjusted to a predetermined condition and a predetermined flow velocity to each cultivation chamber 20B through the air supply pipe 380. At this time, as shown in FIG. 10, the air flow direction in the cultivation chamber 20B is along the transverse direction of the cultivation chamber 20B. As a result, the time from air supply to collection can be shortened as compared with the case where the air is supplied so that the flow direction is along the longitudinal direction of the cultivation chamber 20B. Therefore, it is possible to reduce changes in the cultivation environment such as temperature, humidity, and carbon dioxide concentration that is generated between the upstream side and the downstream side of the air flow.

The nutrient solution circulation device 40, the operation unit 50, the control unit 60, and the display unit 70 have the same configurations as those in the first embodiment, and thus the description thereof is omitted.

Further, as in the case described in the first embodiment, in this embodiment, one cultivation room 10B can have a dimmer 231 of the artificial light source 230, an air circulation device 30, and a nutrient solution circulation device 40, each arranged therefor, and the cultivation environment adjusted by these may be the same in each cultivation chamber 20B. Further, it is also possible to arrange one dimmer 231 and one air circulation device 30 and one nutrient solution circulation device 40 for each cultivation chamber 20B, so that each of the plurality of cultivation chambers 20B has a different cultivation environment.

The transport mechanism 80 is described with reference to FIGS. 12 and 13. FIG. 12 is a schematic view for explaining the configuration of the transport mechanism 80, and FIG. 13 is an explanatory diagram of a transport method of the cultivation plate 220 using the transport mechanism 80.

The transport mechanism 80 is used for transporting the plurality of cultivation plates 220 from outside the cultivation room 10B to a predetermined position in the cultivation chamber 20B, and for transporting a plurality of cultivation plates 220 arranged in the cultivation chamber 20B to take them out to the cultivation room 10B. As shown in FIG. 12, the transport mechanism 80 includes a transporter 810 and an elevator 820. In this embodiment, as an example, a case is described in which the nutrient solution tray 210 is also transported together with the cultivation plate 220.

The transporter 810 is provided in each of the plurality of cultivation chambers 20B, to transport the nutrient solution tray 210 and the cultivation plate 220 in the longitudinal direction of the cultivation chamber 20B. The transporter 810 is configured with a plurality of rollers 811 and a roller support base 812. The plurality of rollers 811 are arranged so as to come into contact with the back surface of the nutrient solution tray 210 and the roller support base 812 is arranged on the bottom surface in the cultivation chamber 20B (see FIG. 10). The plurality of rollers 811 are configured with electrically driven rollers and non-driven rollers. The rotation direction and the amount of rotation of the electrically driven rollers are controlled, so that the nutrient solution tray 210 and the cultivation plate 220 can be transported in the longitudinal direction of the cultivation chamber 20B. It should be noted that all of the plurality of rollers 811 may be configured with electrically driven rollers.

The elevator 820 is provided adjacent to the side of the cultivation chamber 20B where the chamber opening 21 is provided. The elevator 820 inserts and removes the nutrient solution tray 210 and the cultivation plate 220 through the chamber opening 21 and then moves in the vertical direction, to transport the nutrient solution tray 210 and the cultivation plate 220 between the chamber opening 21 and the cultivation room opening 11 provided in the bottom part of the cultivation room 10B. Further, in this embodiment, the elevator 820 is arranged in the cultivation room 10B. Therefore, the transport mechanism 80 is controlled so that the cultivation room opening 11 and the chamber opening 21 are not opened at the same time. This can be considered that the inside of the cultivation chamber 20B is doubly closed, and the closability of the cultivation chamber 20B can be further improved as compared with the case where the elevator 820 is arranged outside the cultivation room 10B. Accordingly, it is possible to further reduce the leakage of air (particularly carbon dioxide) from each cultivation chamber 20B and the mixing of air from outside the cultivation room 10B. Therefore, in one cultivation room 10B, each of the plurality of cultivation chambers 20B can be easily controlled independently in different cultivation environments. In addition, the further enhanced closability can reduce the insects or germs mixing in from outside the cultivation room 10B. Further, if insects, germs or the like grow in one cultivation chamber 20B, it is possible to reduce the possibility that contamination of insects, germs or the like spreads to other cultivation chambers 20B in the same cultivation room 10B.

As shown in FIG. 12, the elevator 820 is configured with a loading platform 821, a support column 822, a tray receiving plate 823, and a plurality of rollers 824.

The loading platform 821 is mounted on the support column 822 extending in the vertical direction, and can be electrically moved in the vertical direction. Further, the tray receiving plate 823 for receiving the nutrient solution tray 210 is mounted on the loading platform 821 so as to be slidable in the longitudinal direction of the cultivation chamber 20B.

The tray receiving plate 823 is configured in a forked shape that can be inserted into the spaces on both sides of the roller 811 and the roller support base 812 shown in FIG. 10.

The plurality of rollers 824 are mounted to the loading platform 821 and are configured with electrically driven rollers and non-driven rollers. The surface formed with the plurality of rollers 824 can be electrically tilted obliquely (see FIGS. 13F and 13G). Controlling the rotation direction and amount of rotation of the electrically driven roller, and tilting the surface configured with the plurality of rollers 824 allows the nutrient solution tray 210 and the cultivation plate 220 to be sent out from the loading platform 821 toward the cultivation room opening 11. It should be noted that all of the plurality of rollers 824 may be configured with electrically driven rollers.

Next, with reference to FIGS. 12 and 13, a transport method using the transport mechanism 80 of the nutrient solution tray 210 and the cultivation plate 220 is described. Here, a case is described in which the nutrient solution tray 210 and the cultivation plate 220 arranged in the bottom-stage cultivation chamber 20B in FIG. 12 are sequentially taken out of the cultivation room 10B.

With the cultivation room lid 12 of the cultivation room 10B closed, the transporter 810 is arranged at a position in the vicinity of the cultivation chamber 20B containing what are to be taken out, so as not to interfere with the chamber lid 22 if it opens and closes. In the case of this embodiment, the transporter 810 is arranged below the cultivation chamber 20B containing what are to be taken out (see FIG. 12).

Figure 13A:
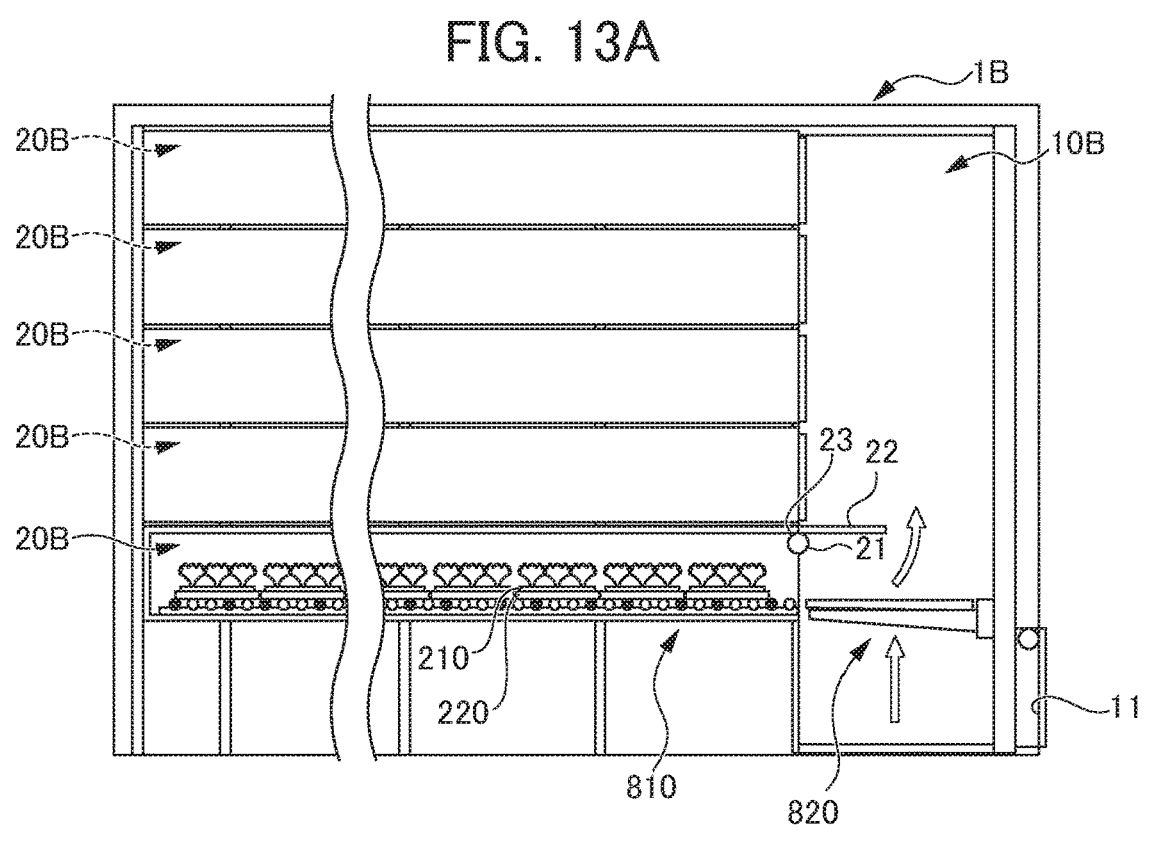
FIG. 13A An explanatory diagram of a method of transporting a cultivation plate using the transport mechanism according to the second embodiment.

Next, after the chamber lid 22 is opened by the electric-powered hinge 23 from the state shown in FIG. 12, the transporter 810 is moved to the vicinity of the lowest end of the chamber opening 21 (see FIG. 13A).

From the state shown in FIG. 13A, the tray receiving plate 823 is slid toward the chamber opening 21 (see FIG. 13B) and is inserted into the spaces on both sides of the roller 811 and the roller support base 812.

Figure 13B:
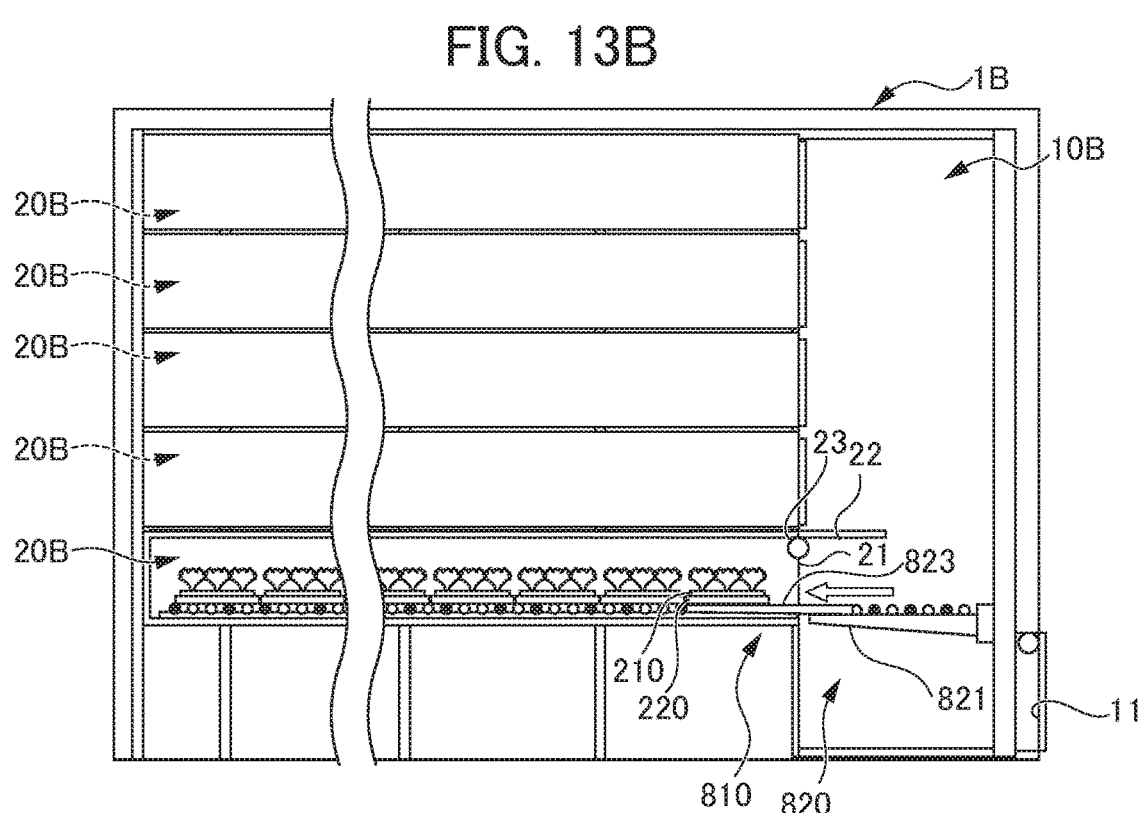
FIG. 13B An explanatory diagram of a method of transporting a cultivation plate using the transport mechanism according to the second embodiment.
Figure 13C:
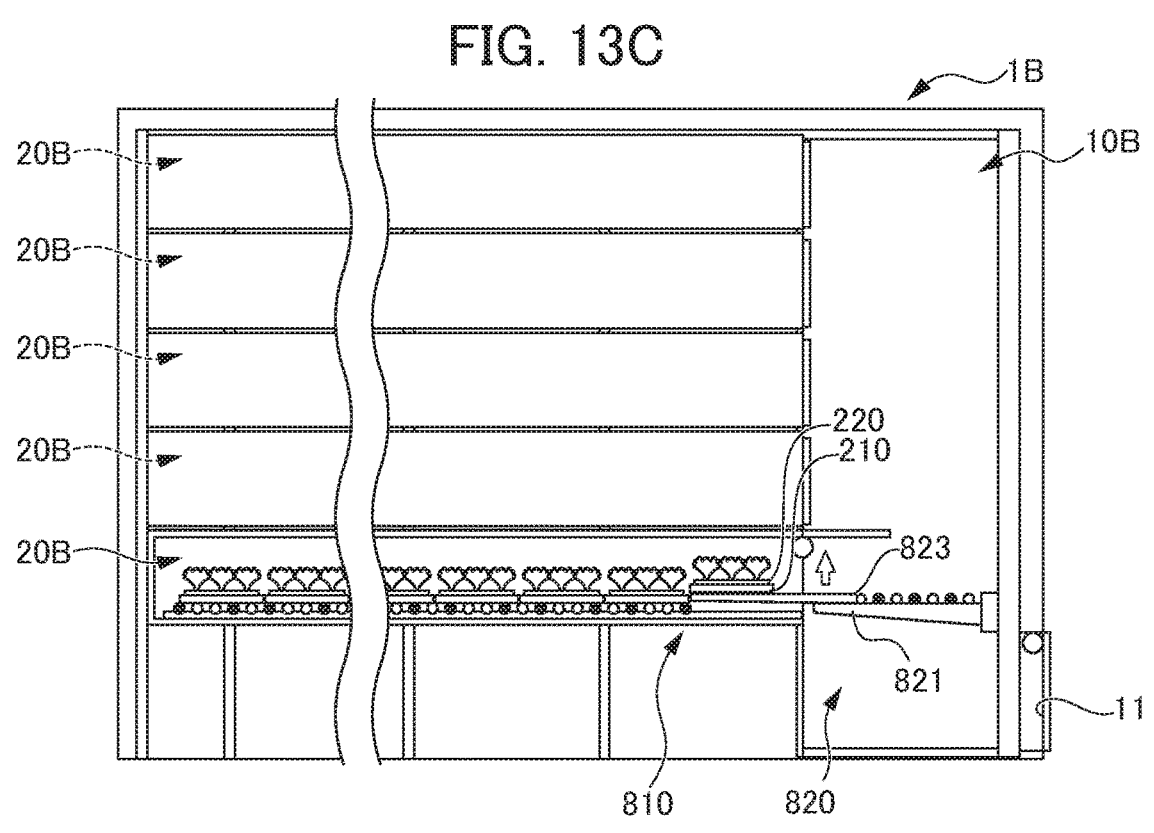
FIG. 13C An explanatory diagram of a method of transporting a cultivation plate using the transport mechanism according to the second embodiment.

From the state shown in FIG. 13B, the loading platform 821 is slightly raised together with the tray receiving plate 823, and the nutrient solution tray 210 and the cultivation plate 220 are loaded on the tray receiving plate 823 (see FIG. 13C).

Figure 13D:
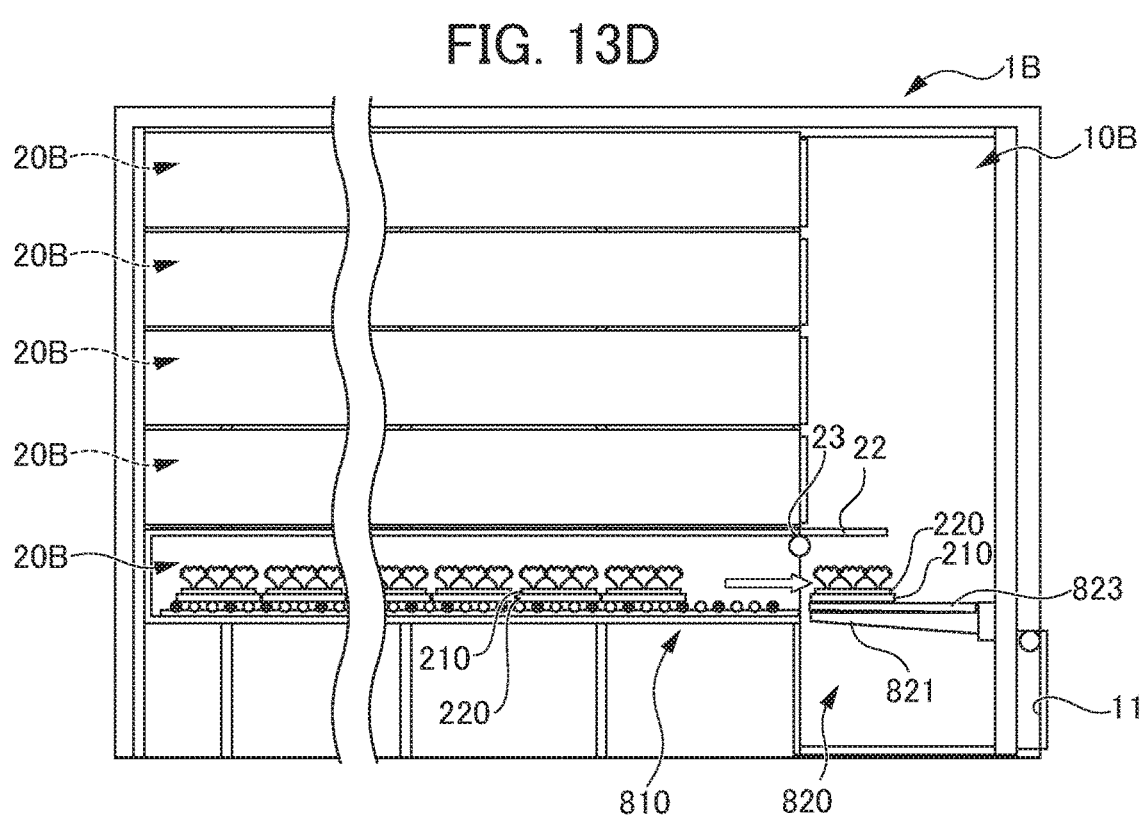
FIG. 13D An explanatory diagram of a method of transporting a cultivation plate using the transport mechanism according to the second embodiment.

From the state shown in FIG. 13C, after the tray receiving plate 823 is slid toward the loading platform 821 side, the loading platform 821 is moved downward toward the cultivation room opening 11 (see FIG. 13D).

From the state shown in FIG. 13D, the loading platform 821 is moved to the cultivation room opening 11 and the chamber lid 22 is closed by the electric-powered hinge 23, and then the electric drive roller of the plurality of rollers 811 of the transporter 810 is operated, to move all the remaining nutrient solution trays 210 (and cultivation plates 220) by one tray length to the chamber opening 21 side. Further, the cultivation room lid 12 is opened by the electric-powered hinge 13 (see FIG. 13E).

Figure 13E:
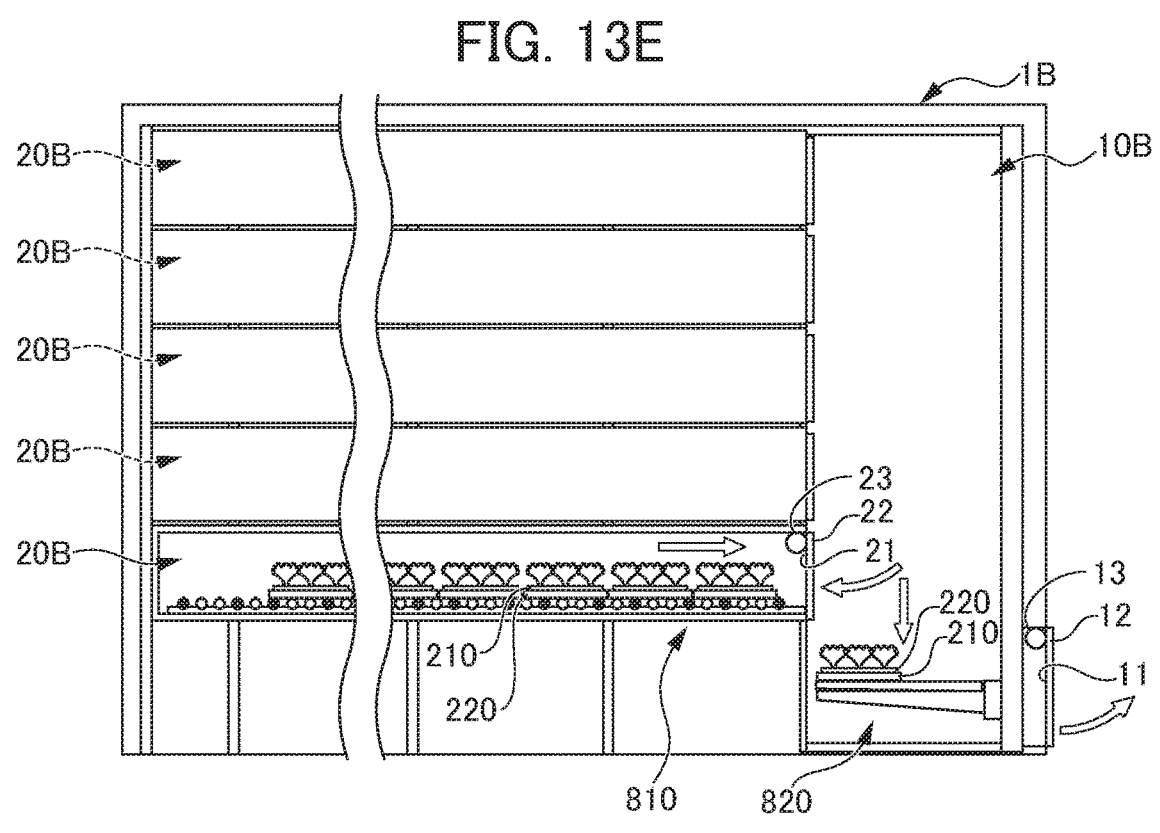
FIG. 13E An explanatory diagram of a method of transporting a cultivation plate using the transport mechanism according to the second embodiment.
Figure 13F:
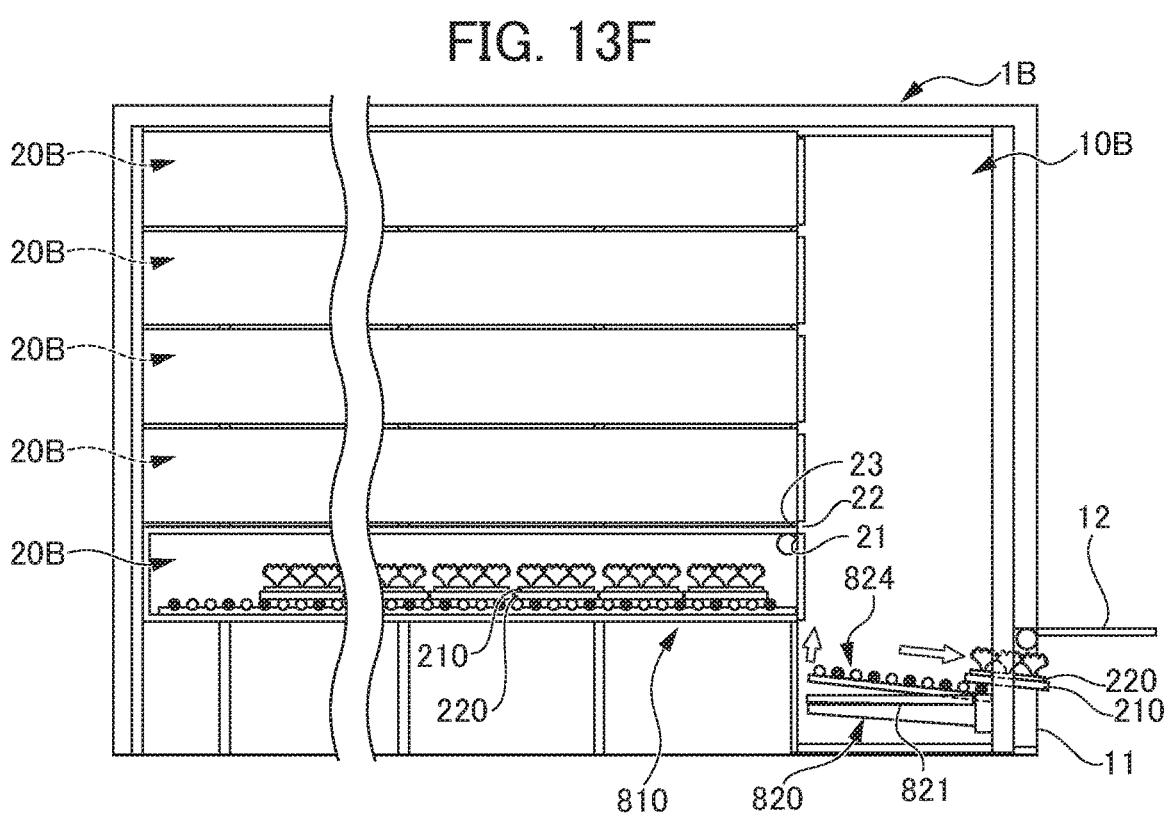
FIG. 13F An explanatory diagram of a method of transporting a cultivation plate using the transport mechanism according to the second embodiment.

From the state shown in FIG. 13E, after the cultivation room lid 12 is opened, a plurality of rollers 824 mounted to the loading platform 821 are tilted obliquely, and the electrically driven rollers of the plurality of rollers 824 are driven, so that the nutrient solution tray 210 and the cultivation plate 220 are moved toward the cultivation room opening 11 by the electrically driven rollers and gravity, and are sent out to the outside of the cultivation room 10B (see FIG. 13F).

Figure 13G:
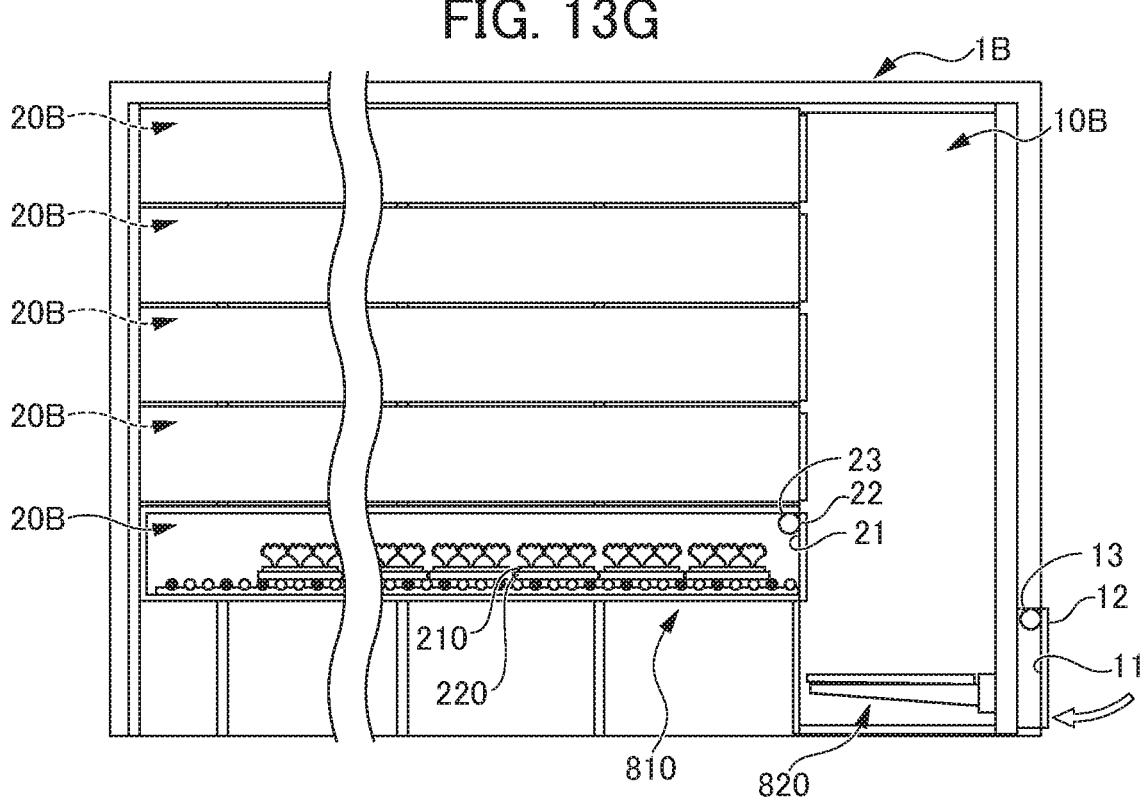
FIG. 13G An explanatory diagram of a method of transporting a cultivation plate using the transport mechanism according to the second embodiment.

From the state shown in FIG. 13F, the nutrient solution tray 210 and the cultivation plate 220 are transferred from the vicinity of the cultivation room opening 11 by a person or other transport means, and then the cultivation room lid 12 is closed by the electric-powered hinge 13 and the tilt of the plurality of rollers 824 mounted to the loading platform 821 is moved back (see FIG. 13G).

Then, the procedure performed in FIGS. 13A to 13G is repeated until all the nutrient solution tray 210 and the cultivation plate 220 in the cultivation chamber 20B at the bottom-stage are taken out. After that, by repeating the same operation in the remaining cultivation chamber 20B, all the nutrient solution trays 210 and the cultivation plates 220 in the cultivation room 10B can be taken out from the cultivation room 10B.

In this way, with the cultivation plate 220 arranged on the nutrient solution tray 210, the transport mechanism 80 can transport one set of the nutrient solution tray 210 and the cultivation plate 220 at a time. In this embodiment, the nutrient solution tray 210 can be collected together with the cultivation plate 220. Therefore, the nutrient solution tray 210 can be easily cleaned, and the inside of the cultivation chamber 20B can be kept clean as compared to a case where the nutrient solution tray is kept placed in the cultivation chamber.

In addition, when the nutrient solution tray 210 and the cultivation plate 220 are moved from outside the cultivation room 10B to be arranged in the cultivation chamber 20B, the procedure in the reverse order of that described above allows a plurality of nutrient solution trays 210 and a plurality of cultivation plates 220 to be sequentially arranged at predetermined positions in the cultivation chamber 20B.

According to the cultivation device 1B of the present invention described above, the following effects are exhibited in addition to the above-mentioned effects (1) to (4).

(6) The cultivation chamber 20B of the cultivation device 1B used in the artificial light plant factory is configured with a box-shaped member, has a chamber opening 21 for inserting and removing the cultivation plate 220 on one end side in the longitudinal direction and a chamber lid 22 that can open and close the opening 21, and can be kept closed by closing the chamber opening 21 with the chamber lid 22. This enables each of the plurality of cultivation chambers 20B to be independently controlled in different cultivation environments in one cultivation room 10B. Moreover, since a plurality of cultivation chambers 20B can be environmentally less affected by each other, if insects, germs or the like grow in one cultivation chamber 20B, it is possible to reduce the possibility that contamination such as insects, germs or the like spread to other cultivation chambers 20B in the same cultivation room 10B.

(7) The cultivation device 1B used in the artificial light plant factory further includes a transport mechanism 80 for transporting the cultivation plate 220. The transport mechanism 80 is provided in the cultivation chamber 20B, and has: a transporter 810 for transporting the cultivation plate 220 in the longitudinal direction of the cultivation chamber 20B; and an elevator 820, which is provided adjacent to the side where the chamber opening 21 of the cultivation chamber 20B is provided, and is used for inserting and removing the cultivation plate 220 through the chamber opening 21 and transporting it in the vertical direction. This enables the cultivation device 1B including the cultivation chambers 20B which are long and stacked in multiple stages to use the transport mechanism 80 to transport the cultivation plate 220 to a desired position.

(8) The elevator 820 of the transport mechanism 80 is provided in the cultivation room 10B. The cultivation room 10B has a cultivation room opening 11 for inserting and removing the cultivation plate 220 and a cultivation room lid 12 that can open and close the opening 11, on one end side in the longitudinal direction, where the elevator 820 is provided. This, as well as controlling the transport mechanism 80 so that the cultivation room opening 11 and the chamber opening 21 are not opened at the same time, can further improve the closability of the cultivation chamber 20B as compared to the case where the elevator 820 is arranged outside the cultivation room 10B. Accordingly, it is possible to further reduce the leakage of air (particularly carbon dioxide) from each cultivation chamber 20B and the mixing of air from outside the cultivation room 10B. Therefore, in one cultivation room 10B, each of the plurality of cultivation chambers 20B can be easily controlled independently in different cultivation environments. In addition, the further enhanced closability can reduce the insects or germs mixing in from outside the cultivation room 10B.

(9) The nutrient solution tray of the cultivation device 1B is configured with a rectangular tray 210 which is substantially the same size as the cultivation plate 220 and in which the cultivation plate 220 can be arranged. The transport mechanism 80 transports the cultivation plate 220 and the rectangular tray 210 in a state where the cultivation plate 220 is arranged on the rectangular tray 210. Thus, the nutrient solution tray 210 can be collected together with the cultivation plate 220. Accordingly, the nutrient solution tray 210 can be easily cleaned, and the inside of the cultivation chamber 20B can be kept clean as compared to a case where the nutrient solution tray is kept placed in the cultivation chamber.

Although the preferred embodiment of the cultivation device of the present invention is described above, the present invention is not limited to the above-described embodiment and can be appropriately modified.

For example, in each of the above-described embodiments, the flow directions of the air and the nutrient solution supplied to the cultivation chamber are the same, but each supply pipe and each collection pipe may be configured so that the flow directions are opposite.

Further, in each of the above-described embodiments, the flow directions of the air and the nutrient solution supplied to the cultivation chamber 20 respectively by the air circulation device 30 and the nutrient solution circulation device 40 are set along the transverse direction of the cultivation chamber 20, but the present invention is not limited to this. That is, the flow directions of the air and the nutrient solution supplied to the cultivation chamber may be along the longitudinal direction of the cultivation chamber.

Further, in each of the above-described embodiments, the configuration, in which the nutrient solution tank is directly connected to the city water supply source and a configuration in which a carbon dioxide cylinder is used as the carbon dioxide supply source, is shown, but the present invention is not limited to this. For example, the plug connected to the city water supply source and the plug connected to the carbon dioxide supply source may be collectively configured as one cultivation device side plug, and this cultivation device side plug may be configured to be connected to a factory side plug provided in the plant factory, which can supply water and carbon dioxide, to supply the water and carbon dioxide to the cultivation device.

Further, in each of the above-described embodiments, the configuration is shown in which the operation unit, the control unit, and the display unit are integrally attached to the cultivation device, but the present invention is not limited to this. For example, instead of an operation unit, a control unit, and a display unit provided in each cultivation device, an operation unit, a control unit, and a display unit, which can centrally control a plurality of cultivation devices individually or collectively, may be provided. The operation unit, control unit, and display unit may be provided at a location away from the installation location of the cultivation device.

Further, in the above-mentioned second embodiment, the configuration, in which the air collection duct and the air supply duct are provided outside the cultivation chamber in the cultivation room, is described as an example, but the present invention is not limited to this. The air collection duct and the air supply duct may be arranged inside the cultivation chamber or outside the cultivation room if the closability inside the cultivation chamber can be maintained.

Further, in the above-mentioned second embodiment, as the method of transporting the cultivation plate, an example, in which the transport mechanism transports the nutrient solution tray together with the cultivation plate, is shown, but the method is not limited to this. The transport mechanism may be configured so that the nutrient solution tray is kept placed in the cultivation chamber and only the cultivation plate is transported.

Further, in the above-mentioned second embodiment, the case, in which the transport mechanism transports one set of the nutrient solution tray and the cultivation plate at a time, is shown, but the transport mechanism may be configured to transport a plurality of sets at a time.

Further, in the above-mentioned second embodiment, the configuration, in which the elevator of the transport mechanism is arranged in the cultivation room, is shown, but the present invention is not limited to this. The elevator may be arranged outside the cultivation room.

Further, in the above-mentioned second embodiment, in the transporter and the elevator of the transport mechanism, the configuration of the roller conveyor system using a plurality of rollers is shown as the transport means in the longitudinal direction of the cultivation chamber, but the present invention is not limited to this. For example, other methods such as a belt conveyor system or a chain conveyor system may be used as the transport means.

EXPLANATION OF REFERENCE NUMERALS 1A, 1B cultivation device
10A, 10B cultivation room
20A, 20B cultivation chamber
30 air circulation device
40 nutrient solution circulation device
50 operation unit
60 control unit
70 display unit
80 transport mechanism
100 cultivation shelf
210 nutrient solution tray (rectangular tray)
220 cultivation plate
230 artificial light source
370A air collection pipe
370B air collection duct
380 air supply pipe
380B air supply duct
420 nutrient solution tank
460 nutrient solution pressure pump
470 nutrient solution collection pipe
480 nutrient solution supply pipe
810 transporter
820 elevator

The invention claimed is:

1. A cultivation device used in an artificial light plant factory, the device comprising:
   a cultivation room having a closable inside via a cultivation room opening;
   a plurality of cultivation chambers including a plurality of stages in the cultivation room, wherein the cultivation chambers are arranged in the vertical direction;
   an air circulation device that supplies air adjusted to a predetermined condition to each of the plurality of cultivation chambers at a predetermined flow velocity so that the environment in the cultivation room can be kept independent from the environment of a work room in which a person works and in which the cultivation device is arranged, and collects and circulates the supplied air from the plurality of cultivation chambers; and
   a nutrient solution circulation device that supplies nutrient solution adjusted to a predetermined condition to each of the plurality of cultivation chambers at a predetermined flow velocity, and collects and circulates the supplied nutrient solution from the plurality of cultivation chambers,
   a control unit,
   wherein a plurality of sets of a cultivation plate and a nutrient solution tray are arranged in the plurality of cultivation chambers,
   the cultivation chambers each include a chamber opening and a chamber lid that can open and close the chamber opening, on one end side in a longitudinal direction,
   the cultivation room includes a cultivation room opening for inserting and removing the cultivation plate between the cultivation room and the work room, and a cultivation room lid for opening and closing the cultivation room opening, on the one end side in the longitudinal direction,
   the cultivation chamber can be kept closed by closing the chamber opening with the chamber lid,
   wherein the cultivation device further includes a first electric-powered hinge associated with the cultivation room lid and a second electric-powered hinge associated with the chamber lid, wherein the control unit controls the first and second electric-powered hinges to prevent the cultivation room lid and the chamber lid from being open at the same time further maintaining the cultivation environment independent from the temperature and humidity of the work room environment; wherein the cultivation room opening is entirely below and offset from the cultivation chamber opening.

2. The cultivation device according to claim 1, wherein the air adjusted to the predetermined condition is supplied to each of the plurality of cultivation chambers at a flow velocity of a set value that is changeable.

3. The cultivation device according to claim 1, wherein the nutrient solution adjusted to the predetermined condition is supplied to each of the plurality of cultivation chambers at a flow velocity of a set value that is changeable.

4. The cultivation device according to claim 1, wherein a flow direction of the nutrient solution supplied to each of the cultivation chambers by the nutrient solution circulation device is along a transverse direction of each of the cultivation chambers.

5. The cultivation device according to claim 1, wherein a flow direction of the air supplied to each of the cultivation chambers by the air circulation device is along a transverse direction of each of the cultivation chambers.

6. The cultivation device according to claim 1, wherein a flow direction in the cultivation chambers of the air supplied to each of the cultivation chambers by the air circulation device is from an upper side to a lower side of the cultivation chamber.

7. The cultivation device according to claim 1,
   wherein the plurality of cultivation plates each have a rectangular shape,
      wherein the plurality of cultivation plates are arranged in each of the cultivation chambers so that a transverse direction of each of the cultivation plates is along a longitudinal direction in each of the cultivation chambers.

8. The cultivation device according to claim 7, wherein the nutrient solution tray has a rectangular shape that is substantially the same size as at least one of the cultivation plates and on which the cultivation plates-can be arranged, and a plurality of nutrient solution trays that are each arranged in at least one of the cultivation chambers so that a transverse direction of the rectangular trays is along the longitudinal direction of at least one of the cultivation chambers.

9. The cultivation device according to claim 1, further comprising a transport mechanism for transporting at least one of the cultivation plates, wherein the transport mechanism has:

a transporter being provided in each cultivation chamber, and being used for transporting at least one of the cultivation plates in the longitudinal direction of the cultivation chamber; and an elevator is provided adjacent to the one end side of the cultivation chambers where the chamber openings are provided, and being used for inserting and removing one set of the cultivation plates and nutrient solution trays at a time through the chamber lids, for transporting the cultivation plates and nutrient solution trays in the vertical direction to the cultivation room opening with a cultivation room lid, and for accepting and delivering the cultivation plates and nutrient solution trays through the cultivation room lid.

10. The cultivation device according to claim 9, wherein the elevator is provided in the cultivation room, and the cultivation room has a cultivation room lid for inserting and removing at least one of the cultivation plates and a cultivation room lid that can open and close the cultivation room opening, on one end side in the longitudinal direction, the one end side having the elevator provided thereon.

11. The cultivation device according to claim 9, wherein the nutrient solution tray arranged in the cultivation chamber and used for causing nutrient solution to flow therein has a rectangular tray that is substantially the same size as at least one of the cultivation plates and on which at least one of the cultivation plates can be arranged, and the transport mechanism transports the cultivation plate and the rectangular tray in a state where at least one of the cultivation plates is arranged on the rectangular tray.

12. The cultivation device according to claim 1, wherein each of the cultivation chambers and the air circulation device are connected via an air collection duct and an air supply duct extending in a longitudinal direction of the cultivation chambers.

13. The cultivation device according to claim 12, wherein the air collection duct includes a plurality of air collection ports provided therein at predetermined intervals, for allowing the air in the cultivation chamber to pass into the air supply duct.

14. The cultivation device according to claim 8, wherein the nutrient solution trays each includes a surface at a predetermined angle in the transverse direction of each of the cultivation chambers so that a downstream side of nutrient solution flow is lower.

15. The cultivation device according to claim 1, further comprising a tray receiving plate, wherein the tray receiving plate is in a forked shape that can be slid toward the chamber opening and inserted into spaces on both sides of a roller and roller support base.

16. The cultivation device according to claim 15, wherein the tray receiving plate for receiving the nutrient solution tray is mounted on a loading platform so as to be slidable in the longitudinal direction of the cultivation chamber.

17. The cultivation device according to claim 9, wherein after the cultivation room lid is opened, a loading platform is tilted, and can be controlled by a rotation direction and an amount of rotation of an electrically driven roller, so that the nutrient solution tray and the cultivation plate can be moved toward the cultivation room opening by electrically driven roller and gravity, and can be sent out of the cultivation room.

18. The cultivation device according to claim 1, wherein the plurality of cultivation chambers each have a box shape and each include a closable inside that is selectably opened for insertion or removal of the nutrient solution tray and the cultivation plate and closed for maintaining a cultivation environment independent from the temperature and humidity of a work room environment, wherein each of the plurality of cultivation chambers has only a single chamber opening on one end side in the longitudinal direction of the cultivation chamber for inserting and removing one set of the nutrient solution tray and the cultivation plate at a time, and wherein it is possible to pick out one set of the nutrient solution tray and the cultivation plate at a time from each of the plurality of cultivation chambers and the inside of the cultivation chamber is adapted to be doubly closed by the cultivation room opening and the chamber opening.

19. The cultivation device according to claim 1, wherein within the cultivation room at least two of the plurality of cultivation chambers can be controlled independently, each having a different cultivation environment.

20. The cultivation device according to claim 1, wherein the cultivation device is configured such that only one of said chamber lids can be open at any given time.

* * * * *